United States Patent [19]

Anderson et al.

[11] Patent Number: 4,661,987

[45] Date of Patent: Apr. 28, 1987

[54] VIDEO PROCESSOR

[75] Inventors: Vernon A. Anderson; Daryl E. Hinman; Jon H. Bumgardner, all of Ridgecrest, Calif.

[73] Assignee: The United States of America as represented by the Secretary of the Navy, Washington, D.C.

[21] Appl. No.: 740,942

[22] Filed: Jun. 3, 1985

[51] Int. Cl.[4] .............................................. G06K 9/36
[52] U.S. Cl. ..................................... 382/41; 382/44; 382/47; 358/21 R; 358/160; 364/723
[58] Field of Search ................. 340/728, 731; 358/287, 358/21 R, 22, 160, 180; 382/44, 47, 41; 364/577, 723

[56] References Cited

U.S. PATENT DOCUMENTS

| | | | |
|---|---|---|---|
| 2,843,028 | 7/1958 | Ward et al. | 95/12 |
| 2,995,830 | 8/1961 | Jordan, Jr. et al. | 35/10.2 |
| 3,526,043 | 9/1970 | Frasca | 35/12 |
| 3,935,381 | 1/1976 | Petrocelli et al. | 178/7.1 |
| 4,002,824 | 1/1977 | Petrocelli et al. | 358/180 |
| 4,163,249 | 7/1979 | Michael et al. | 358/21 R |
| 4,176,468 | 12/1979 | Marty, Jr. | 35/10.4 |
| 4,209,832 | 6/1980 | Gilham et al. | 364/521 |
| 4,220,965 | 9/1980 | Heitman et al. | 358/22 |
| 4,308,015 | 12/1981 | Tye | 434/14 |
| 4,417,276 | 11/1983 | Bennett et al. | 358/160 |
| 4,447,882 | 5/1984 | Walz | 364/521 |
| 4,472,732 | 9/1984 | Bennett et al. | 358/160 |

Primary Examiner—Leo H. Boudreau
Assistant Examiner—Jose L. Couso
Attorney, Agent, or Firm—William C. Townsend; W. Thom Skeer; Stephen J. Church

[57] ABSTRACT

A method and processor for varying the size of a digitized video image in substantially two video frame times by transforming successive lines of the image along one axis and then transforming successive lines of the image along the other axis.

6 Claims, 15 Drawing Figures

*Reduction*

*Expansion*

VIDEO PROCESSOR

BACKGROUND OF THE INVENTION

1. Field of the Invention

The subject invention pertains to the art of image analysis. More particularly, this invention relates to image transformation to change the scale or size of an image in near real time.

2. Description of the Prior Art

It is well known to digitally represent a video image, such as a conventional video frame, by digitizing successive analog signals representing successive horizontal lines of the frame and storing numerical values representing the brightness of successive elements or pixels along each line as successive elements along a row of a two-dimensional array, the values representing successive lines being stored as successive rows so that successive sets of corresponding elements along the rows are elements of successive columns of the array. When an entire frame is represented as such an array, it is well known to use a transform based on the geometry of similar figures to calculate pixel values of an image of a different size than an image present in the original frame, successive such transforms being used to give a "zoom" effect. In such a transform it is known to interpolate between the brightness of adjacent pixels of a portion of the original image to determine the brightness of a pixel or pixels representing a corresponding portion of the varied image.

This prior art approach to image size variation is straightforward when there are no constraints on time and processor memory size and when the size variations between every successive pair of frames are known in advance. However, at the standard video frame rate of 30 frames per second with each frame represented, typically, by an array having about 500 elements in each row and column, it is evident that a vast amount of digital memory is required to store frames giving a zoom effect lasting a few seconds. Further, the general solution for varying the size of an image represented by such an array involves the possible effect of every original image pixel in every transformed image pixel. As a result, in a 500 by 500 array, $(500 \times 500)^2$ or $6.25 \times 10^{10}$ calculations might be involved so that such processing to achieve video image size variations in real or near real image time is not practical.

It is, of course, possible when sufficient memory is available to generate in non-real time a plurality of arrays representing successive video frames and then output the frames in real time if the size variations between images of every successive pair of frames are known in advance. However, when testing the dynamic response of a control system to movements of an object represented by simulated images, it is evident that each image is not known until the control system has responded to the previous image. As a result, it is not possible to generate images in advance for such control system testing. In dynamic response testing it is not possible to slow down the presentation of successive images to much less than real time and obtain significant results representing true real time dynamics of a control system.

SUMMARY OF THE INVENTION

The present invention varies the size of an image represented as a two-dimensional array by first interpolating along each vector of one parallel set thereof and then interpolating along each vector of the other set thereof, the digitized intermediate image of alternate frames being stored along rows of an orthogonally arranged memory and read along columns thereof while the intermediate images of the other frames are stored along columns and read along rows. The interpolations of each row are identical, as are the interpolations of each column, and are preferably carried out by multiply and accumulate units using stored coefficients.

It is an object of the present invention to provide an improved method and processor for varying the size of a video image.

Another object is to provide such a method and processor which generates a succession of images varied in size with each image being generated in near real time.

Another object is to provide such a method and processor requiring a relatively limited amount of memory.

Another object is to provide such a method and processor in which the size of successive images may be varied in near real time and the size of each image need not be defined until immediately prior to the time of generating the image.

A further object of the invention is to provide a method and processor adapted to vary the size of simulated images provided for dynamic testing of a control system.

BRIEF DESCRIPTION OF THE DRAWINGS

Other objects, advantages, and novel features of the invention will become apparent from the following detailed description of the invention when considered with the accompanying drawing figures, wherein.

DESCRIPTION OF THE PREFERRED EMBODIMENT

Figure 1:
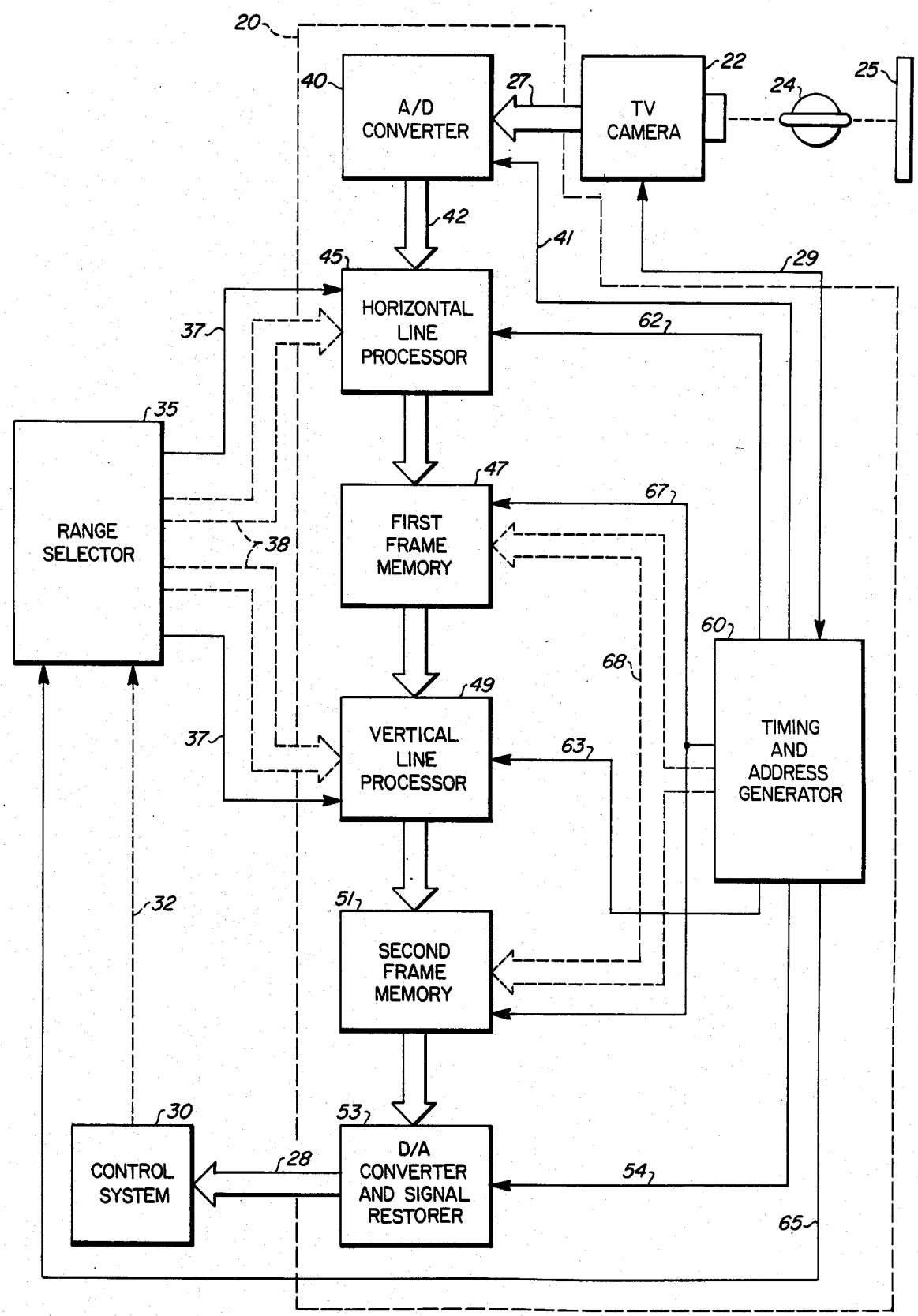
FIG. 1 is a general arrangement block diagram of a video processor embodying the principles of the subject invention together with schematically depicted elements of a representative operating environment.

In FIG. 1 a video processor 20 embodying the principles of the subject invention is depicted in a representative operating environment which includes a T.V. camera 22 viewing a model object 24 against a contrasting background 25. Camera 22 generates analog input signal 27 which represents a video image of the object and is provided to processor 20 for processing thereby in near real time to generate an output signal 28 representing the image of a different apparent size. Signals 27 and 28 and other signals representing a video image are depicted by broad, solid arrows in FIGS. 1 through 4. In these figures address and coefficient signals are depicted by broad dash arrows. Control signals, such as signals 29 synchronizing processor 20 and camera 22, are depicted by solid line arrows.

The operating environment includes a control system 30 which receives signal 28 and typifies any system responsive in some manner to the approach of an actual object, which corresponds to model object 24, to a vehicle bearing system 30. The response of system 30 is provided as any appropriate signal 32, which is represented by a dash line arrow, to a range selector 35 which is included in the operating environment and which, typically, is a digital computer system. Selector 35 computes the relative size of an actual object approaching such vehicle based on signal 28 and, as will be explained in greater detail, provides control signals 37 and digital coefficient signals 38 selecting the size of the next image provided by processor 20 to correspond with the size of an actual object whose approach would have generated the same signal 32.

Figure 5A:
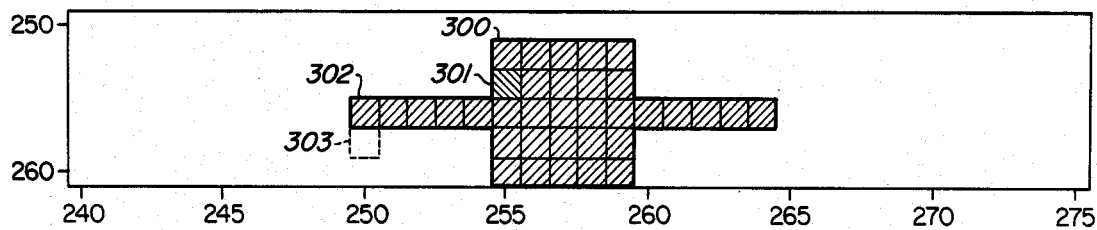
FIGS. 5A–5C are diagrams of an image represented by a two-dimensional array stored at typical addresses of the memory system of FIG. 3 during successive steps in expansion of the image by the video processor.
Figure 5B:
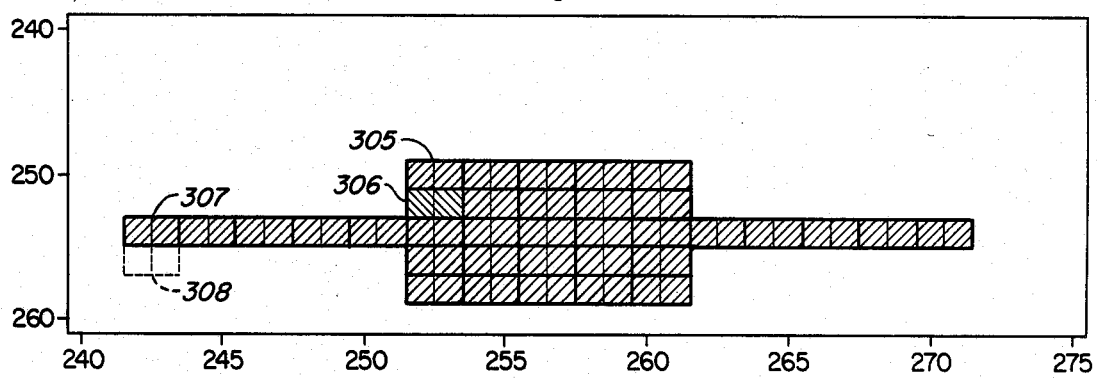
Figure 5C:
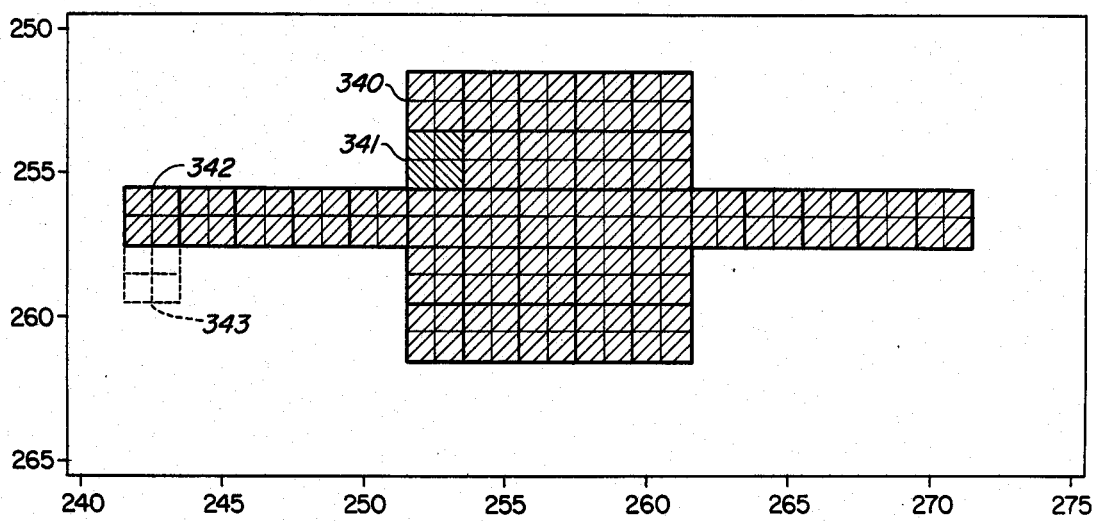

The general arrangement of processor 20 will now be described with reference to FIG. 1. Processor 20 includes an analog to digital (A/D) converter 40 of well-known construction which receives signal 27 and converts it, at intervals determined by a clock signal 41, to a digital signal 42, typically six bit parallel, in which successive digital values represent one input image or video frame generated by camera 22. Such an image is conceptually depicted in FIG. 5A. As the digital values of signal 42 are generated, they are provided directly and successively to a first or horizontal line processor 45 which varies the size of the input image in one dimension, as depicted in FIG. 5B, by digital calculations, preferably interpolations for accomplishing one portion of a separable two-dimensional transform. As the values corresponding to one video frame are generated by processor 45, these values are provided directly and successive to a first frame memory 47 and are stored therein while values corresponding to the previous frame are output directly and successively from memory 47 to a second or vertical line processor 49. Processor 49, in a manner similar to that of processor 45, varies the size of the image in the dimension orthogonally related to the dimension varied by processor 45 to accomplish the other portion of such transform and complete the size variation so as to generate an output image as depicted in FIG. 5C. Digital values calculated by processor 49 and corresponding to one frame are provided directly and successively as they are generated to a second frame memory 51 and stored therein while values corresponding to the previous frame are output directly and successively from memory 51 to a digital to analog (D/A) converter and signal restorer 53 which is of any suitable and well-known construction and which generates output signal 28 from the digital values under control of any suitable signals 54.

Processor 20 includes a timing and address generator 60 which is receptive to certain of the signals 29 and generates certain others thereof as well as generating signals 41 and 54. Generator 60 provides control signals 62 to processor 45, control signals 63 to processor 49, control signals 65 to selector 35, and provides substantially the same control signals 67 and address signals 68 to both memories 47 and 51. These signals generated by generator 60 will be described in greater detail and keep the elements of processor 20 and selector 35 synchronized with successive image frames generated by camera 22.

Figure 8A:
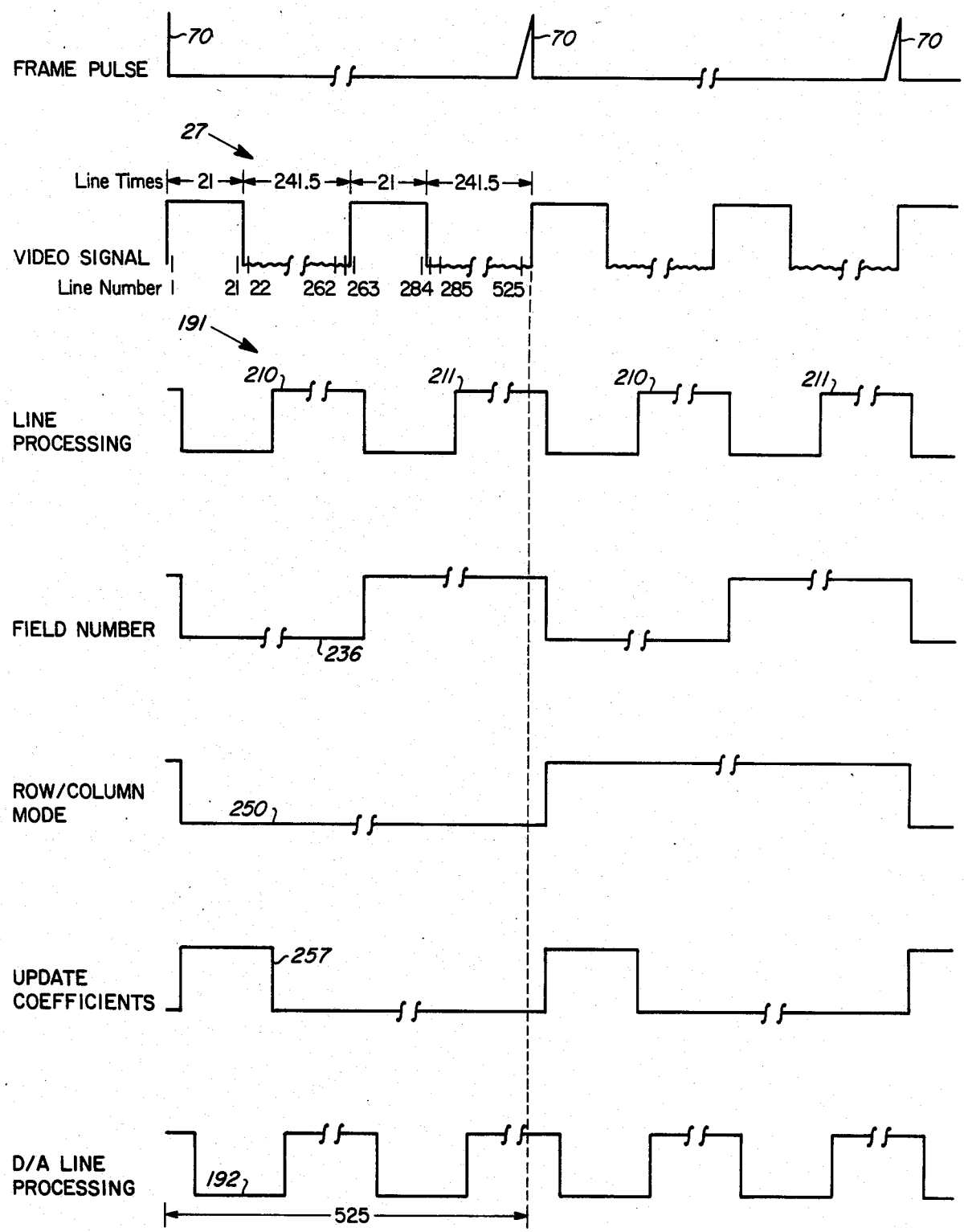
FIGS. 8A–8C are diagrams of signals utilized in the video processor and related, respectively, to video frame timing, video line timing, and memory system timing.

A processor similar to processor 20 and embodying the principles of the subject invention may be utilized with any analog video signal representing successive images, and the method of the subject invention may be used with any digital values representing successive images and generated in any manner. However, the structure and operation of processor 20 will be described as utilized with the standard United States analog video frame signal. This signal is identified as "video signal" in FIGS. 8A and 8B and is briefly reviewed at this point for convenience in understanding the subject invention. In this standard signal, successive frame signals, as seen in FIG. 8A, utilize 1/30 of a second and have 525 horizontal line times of 63.49 msec each. Camera 22 provides a frame pulse signal 70, FIGS. 8A and 4B, at the beginning of each frame of input signal 27. During line times 1 through 21 no image data is provided, allowing a scanning beam to move from the bottom of a video screen to the upper left hand corner. These 21 line times are thus a predetermined period of time during which no video signal representing a video line forming a portion of a viewable image is provided to converter 40. During the following $241\frac{1}{2}$ line times generally horizontal and substantially parallel visible lines, a first field of the frame, are scanned in succession downwardly of the screen. During the next 21 line times the scan returns again to the top of the screen. During the remaining $241\frac{1}{2}$ line times successive horizontal lines, which are interlaced alternately with the lines of the first field, are provided as a second field of the frame. If the half line ending the first field and the half line beginning the second field are disregarded it is apparent that the first field exists during line times 22 through 262, that the second field exists during lines times 285 through 525, and that there are 482 lines of viewable video data in a frame.

Figure 4A:
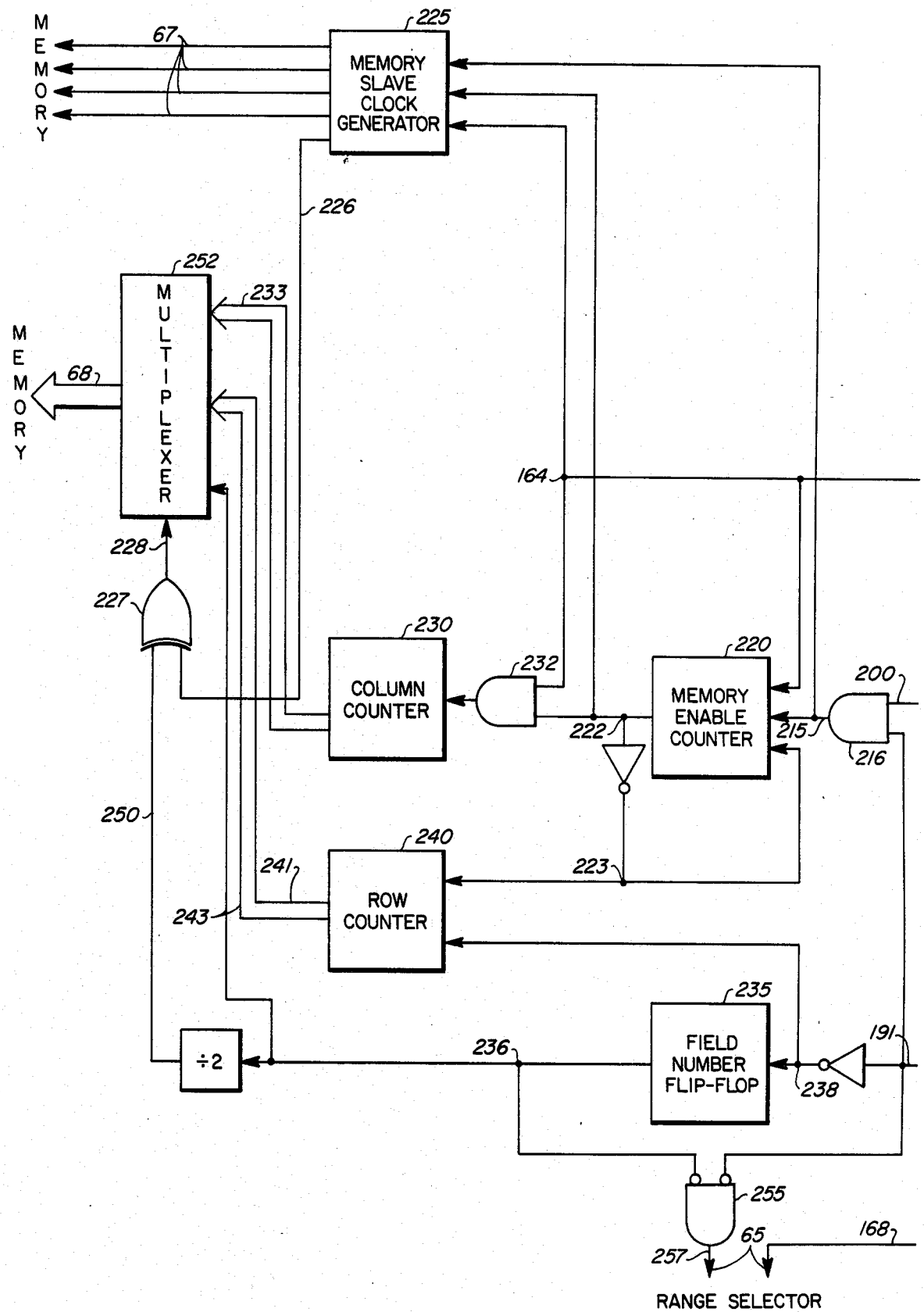
FIGS. 4A and 4B are a block diagram of a timing and address generator included in the video processor.
Figure 4B:
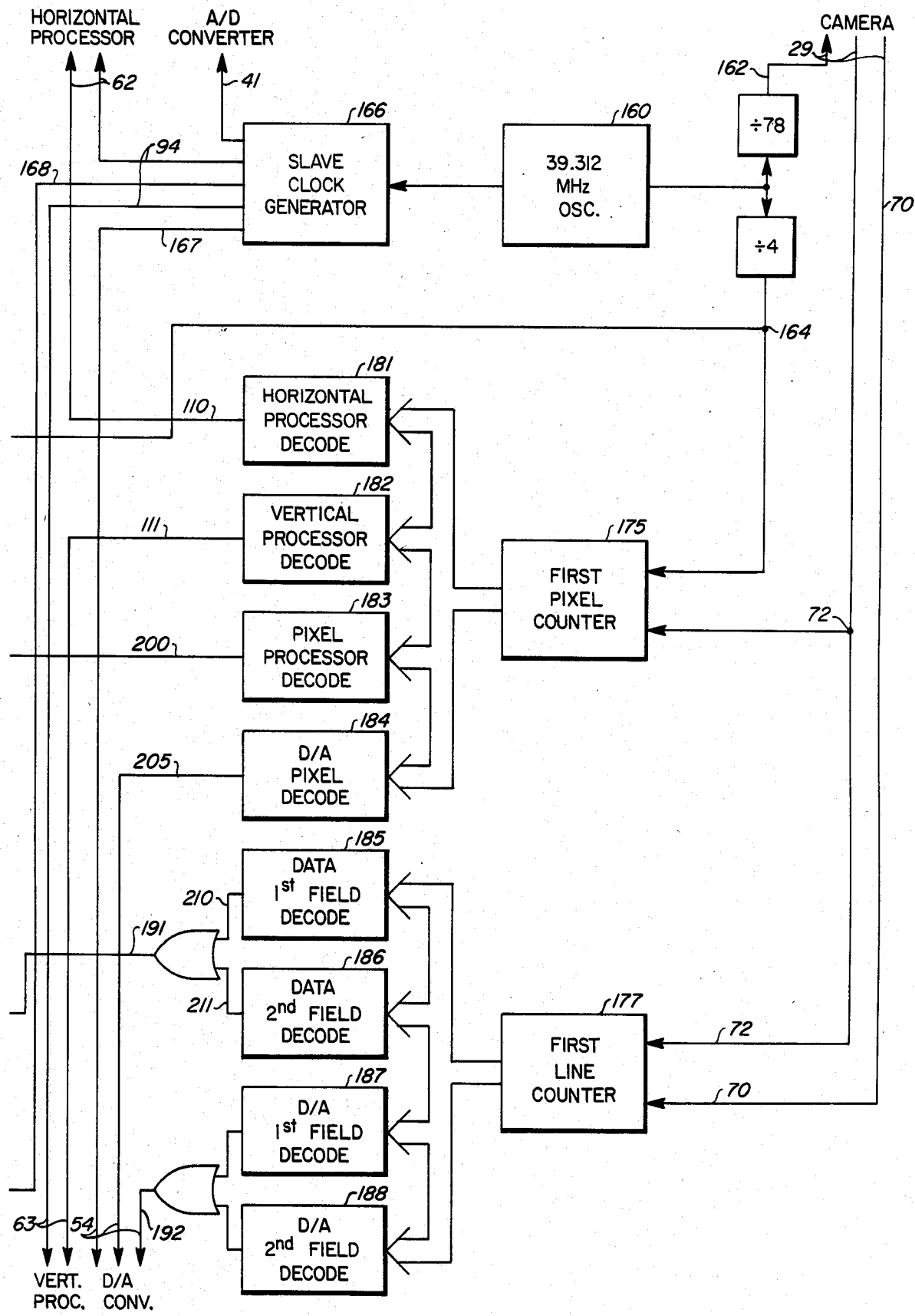
Figure 8B:
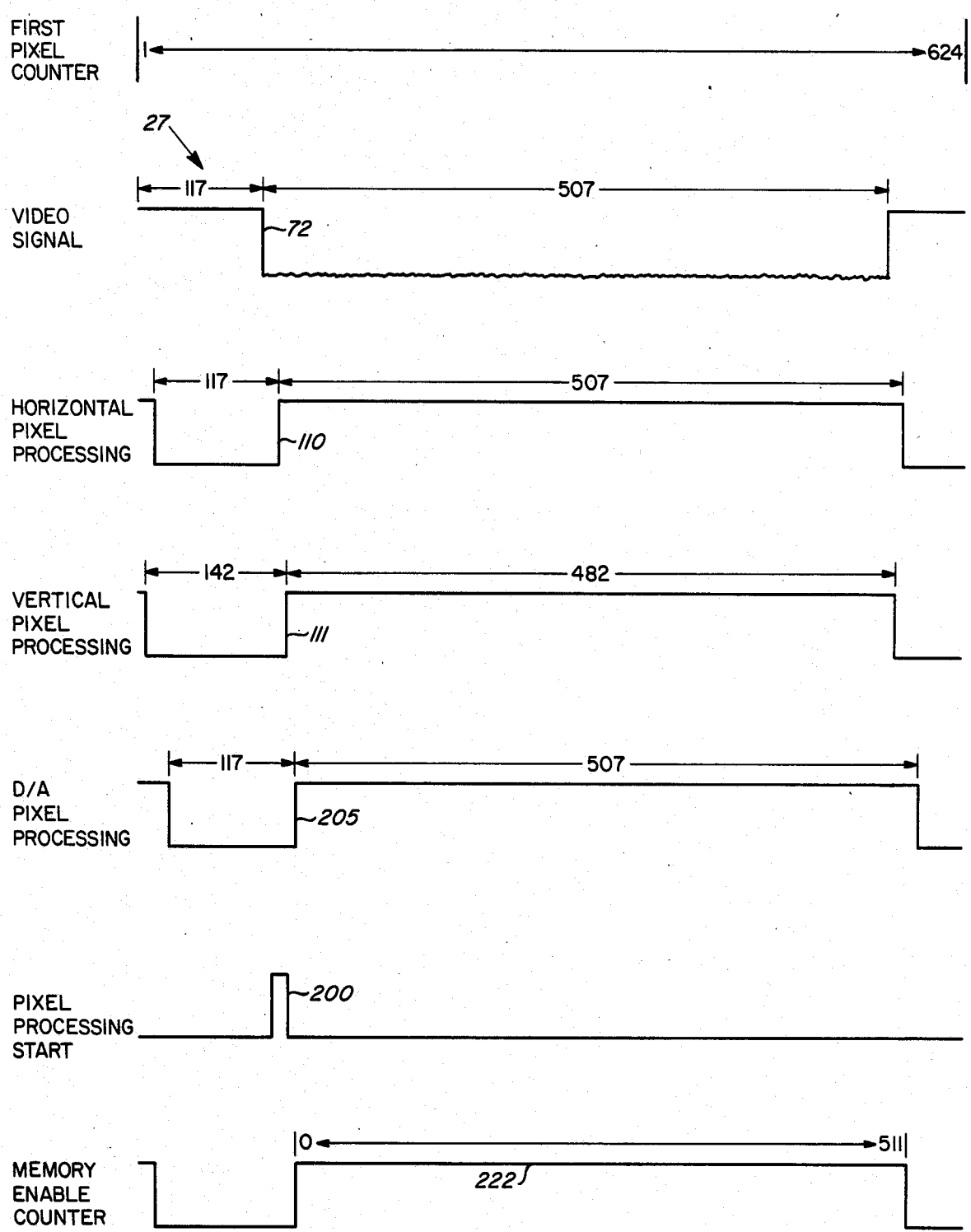

During each such line the initial portion provides no viewable video data and is utilized for restoring the scan to the left side of a video screen, the analog video signal having a predetermined level or horizontal drive signal 72, FIGS. 8B and 4B, during this time. If each line time is divided into a suitable number of pixel times, for example 624 pixel times each of approximately 102 nsec, the horizontal drive exists, typically, for 117 pixel times and the rise of the analog signal to this level signifies the beginning of the line. During the remaining 507 pixel times viewable data is presented so that successive portions of the overall analog signal during these remaining pixel times correspond to rows of the image and form a first set of lines which are substantially horizontal. A clock signal 41 having a period of 102 nsec will cause converter 40 to generate 507 digital values individually representing the brightness of the video image during 507 successive picture elements or pixels of each video line. It is apparent that the overall frame signal representing an individual video image may be considered as being made up of a plurality of time varying signals corresponding to successive horizontal lines of the frame. It is also apparent that the pluralities of pixel values, which correspond to the same pixel time or interval of each of the 482 lines of video data, correspond to 507 vertical lines or columns which form the image and are a second set of lines orthogonally related to the first set.

The elements of processor 20 will now be described in greater detail beginning with line processors 45 and 49. These processors are substantially identical so that FIG. 2 represents either line processor, although horizontal processor 45 is referred to as an example.

Processor 45 successively receives six bit pixel values as signal 42 from converter 40. These values are routed by multiplexers 80 to either a line memory 82 or an arithmetic or logic unit 84 depending on a mode signal 86 from selector 35 which selects whether processor 45 is to expand or to reduce the image represented by signal 42. Mode signal 86 also selects, by a multiplexer 88, whether processed pixel values output by processor 45 are provided directly from memory 82 or directly from unit 84. Memory 82 is adapted, as by double buffering, to input one pixel value while outputting another pixel value in the same pixel time, the input being stored at a location selected by an address signal 91 and the output location being selected by an address signal 92. Memory 82 has sufficient storage locations, typically 512 for input and for output, to store the pixel values in a line of video data. Memory 82 is synchronized with unit 84 and other elements of processor 20 by a pixel time frequency clock signal 94 from timing generator 60. Mode signal 86, by multiplexers 96, selects address signals 91 and 92 alternately from an address counter 98, which is clocked by signal 94 to provide sequential addresses, and from a coefficient memory 99 which, in effect, provides random addresses as subsequently explained.

Multiplexers 80, 88, and 96 are adapted so that, during reduction of an image as selected by signal 86, successive pixel values from one video line input successively to processor 45 or 49 are routed to unit 84 and are output therefrom, after calculations subsequently described, to line memory 82 at random addresses provided from coefficient memory 99. While these operations take place with the pixel values of a line, pixel values corresponding to the previous line are output from sequential addresses provided by counter 98, the previous line values being routed from the line memory by multiplexer 88 to frame memory 47 from processor 45 or to frame memory 51 from processor 47. During expansion of an image, successive pixel values of one line of an image are input to line memory 82 at sequential addresses provided by counter 98 while pixel values of the previous line are output to arithmetic and logic unit 84 from random locations at addresses provided by coefficient memory 99. On expansion, after calculations by unit 84, pixel values are directed directly therefrom by multiplexer 88 to frame memory 47 or 51.

Figure 2:
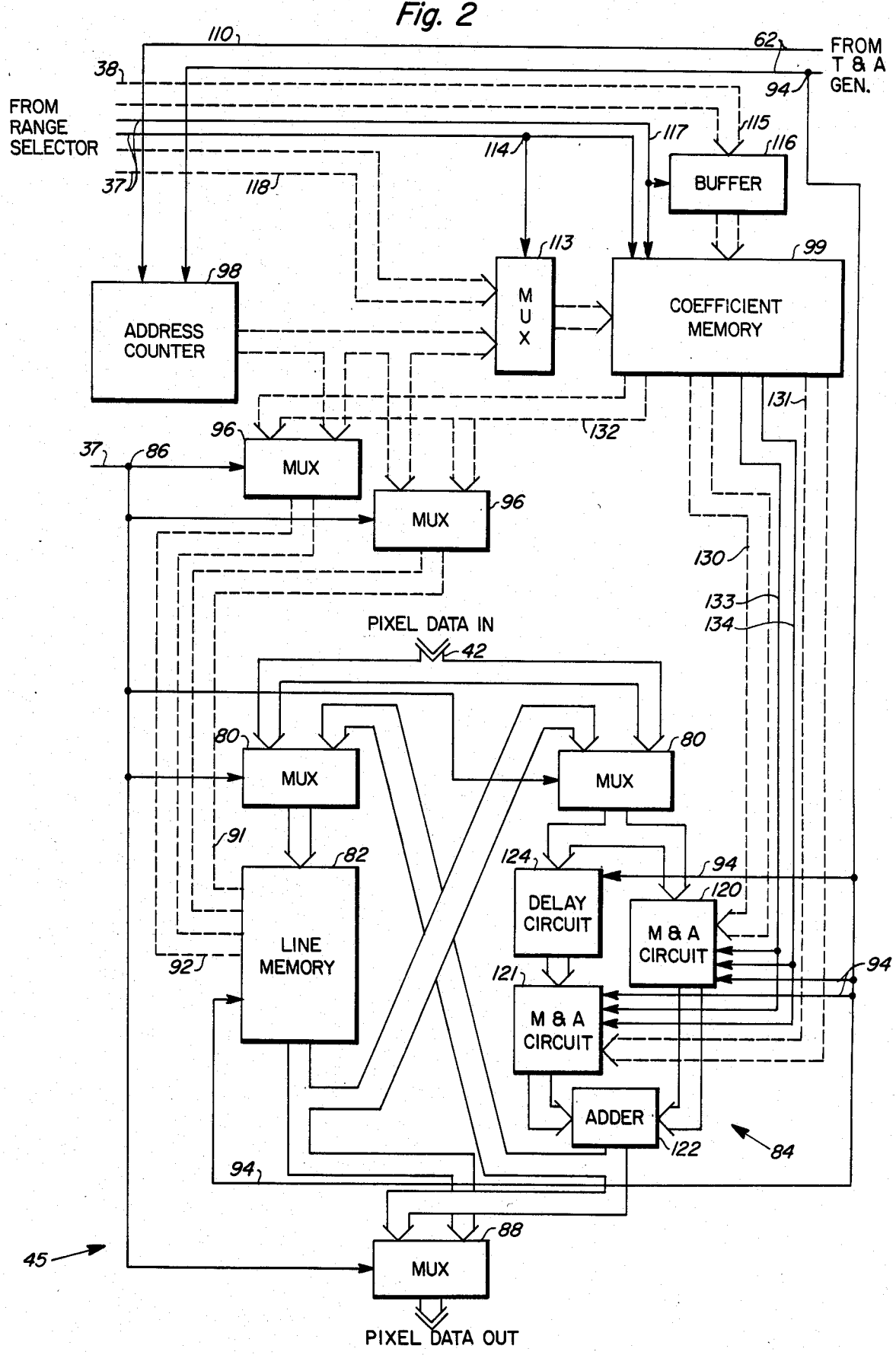
FIG. 2 is a more detailed block diagram of a line processor included in the video processor of FIG. 1.

Address counter 98 of horizontal processor 45 has a reset connection which receives a horizontal line processor ready signal 110, shown in FIGS. 2 and 4B, from timing and address generator 60. The corresponding address counter of vertical processor 47 receives a vertical line processor ready signal 111, shown in FIG. 4B, from generator 60. Counter 98 provides a digital value of sufficient magnitude to address every location in line memory 82. Coefficient memory 99 has the same number of locations which, when unit 84 is calculating pixel values, are addressed sequentially by counter 98 as determined by a multiplexer 113 under control of a write signal 114 from selector 35, this signal also being provided to coefficient memory 99. Digital signals 115 representing coefficients for storage in memory 99 are provided thereto through a buffer 116 under control of a clock signal 117 at addresses provided through multiplexer 113 by digital signals 118 from selector 35. Selector 35 is thus adapted, by asserting write signal 114, to serve as a source of coefficients or coefficient values and to store such values at random locations in memory 99 determined by address signals 118 under control of clock signal 117. After the coefficients are stored, it is evident that the addresses in which they are stored may be addressed successively by address values from counter 98 when signal 114 is not asserted. Buffer 116 or any other suitable elements for transmitting signals 115 thus serve to receive the coefficients from selector 35 and provide them to coefficient memory 99.

Arithmetic and logic unit 84 includes an immediate pixel value multiply and accumulate circuit 120 and a delayed pixel value multiply and accumulate circuit 121. The circuits are substantially identical and are of well known construction. Circuits 120 and 121 output to an adder 122 which continually provides the sum of their outputs to multiplexer 88 and to the one of the multiplexers 80 which selects the input to line memory 82. Circuit 120 receives successive pixel values directly from the other of the multiplexers 80 while circuit 121 successively receives, from a one pixel time delay circuit 124, the pixel values immediately preceding the values to circuit 120. Circuits 120, 121, and 124 are synchronized by clock signal 94. Each pixel value received by circuit 120 or 121 is one factor of a multiplication performed thereby with respective factors 130 and 131. A pair of these latter factors used at the same pixel time are stored in the same location in coefficient memory 99 as portions of a single coefficient. This coefficient also includes a random address, provided as signal 132, through multiplexer 96 to line memory 82 and includes a round selection bit and an accumulate selection bit, the latter two bits being provided, respectively, as signals 133 and 134 to both circuit 120 and circuit 121. Circuits 120 and 121 each provide, when clocked, the product of the pixel value input thereto and of the corresponding factor 130 or 131. When accumulate signal 134 is asserted, this product is summed with a previously calculated product or products. When round signal 133 is asserted, a carry occurs into such product so that the factor of corresponding signal 130 or 131, which is fractional, may be made effectively equal to one.

When coefficient memory 99 has been stored with such coefficients by selector 35 and ready signal 110 has reset counter 98, successive pixel time clock signals 94 increment this counter so that it provides successive addresses to the coefficient memory resulting in output of successive coefficients therefrom and the reception of factors 130 and 131 and signals 133 and 134 by circuits 120 and 121. It is evident that, if signal 110 is provided by generator 60 to reset counter 98 when the initial valid pixel value of a succession thereof representing a video line is provided to processor 45, successive such coefficients will be individually associated with such pixel values at circuits 120 and 121. These circuits will then perform on each value any calculation predetermined by the associated factors 130 and 131, such as a calculation required for a transform being utilized by horizontal line processor 45 to vary the size of an image included in the video line. It is apparent that occurrence of ready signal 110 to vertical line processor 47 will initiate similar calculations required by such a transform and involving coefficients individually related to successive pixel values provided to processor 49.

It is evident that units 84 of processors 45 and 49 are each adapted to perform in one pixel time an interpolation between a pair of successive pixel values along a line of a video image to generate a pixel value of a transformed image. Any desired relative weight may be given to the two input values by selecting the corresponding factor 130 or 131. This interpolation may be a first order interpolation, that is, a linear interpolation between two points along a line, or may be of a lower order including zero order or nearest neighbor interpolation. For zero order interpolation one factor is set to zero while the other is effectively made equal to one as previously described. It can be seen that a unit 84 may calculate a running average of several successively input pixel values or may calculate the results of successive interpolations therebetween by utilizing the accumulate signal 134. In reduction, the result of any such accumulation may be stored at any location in line memory 82 by placing the address 132 thereof in the appropriate coefficient stored in memory 99 and by having the final pair of factors 130 and 131 utilized in determining the average. Intermediate results in the averaging may be stored at this line memory location and overlaid by the final value or may be stored at a dummy address or addresses determined by previously supplied coefficients. It is apparent that, by providing units similar to unit 84 with more than two multiply and accumulate circuits, which are similar to circuits 120 and 121 and output to suitable adders, and by providing each additional such circuit with delay circuits which are similar to circuit 124 and which delay the pixel values input to the circuit a corresponding number of pixel times, any desired higher order of interpolation may be performed. For such higher order interpolation the coefficients stored in a coefficient memory corresponding to memory 99 are extended to contain a factor for each multiply and accumulate circuit.

Figure 3:
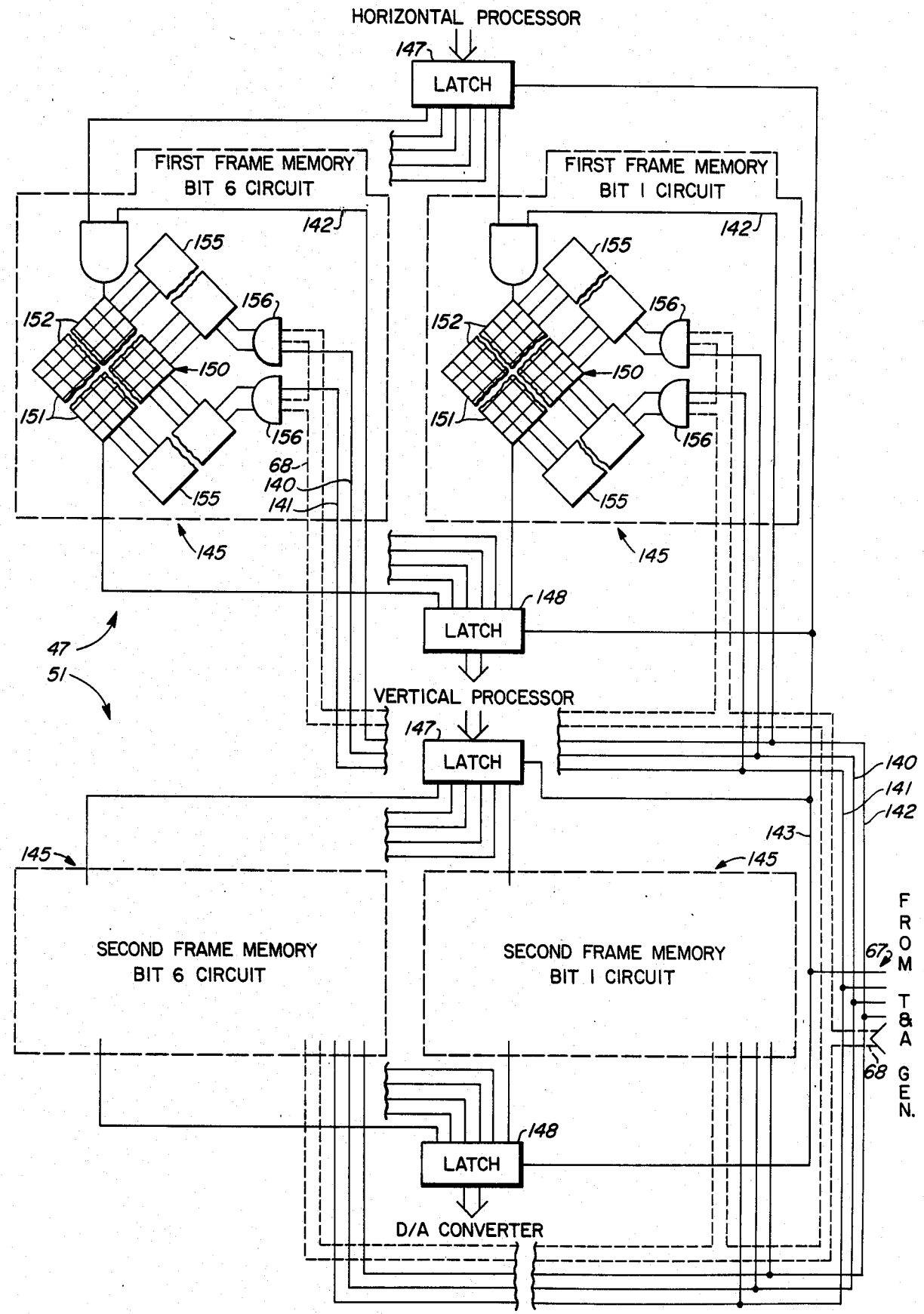
FIG. 3 is a schematic representation of a frame memory system included in the video processor.

A representative arrangement suitable for memory 47 or memory 51 is depicted in FIG. 3. These memories are substantially identical and are connected in parallel, as shown in FIGS. 1 and 3, to a bus having time phased row and column address signals 68 and control signals 67. The control signals include, as shown in FIG. 3, a row address ready signal 140, a column address ready signal 141, a write signal 142, and a latch signal 143. These control signals are provided by generator 60 in a cycle requiring one pixel time during which these signals have the levels represented in FIG. 8C. For use with pixel values represented by six bits each memory 47 or 51 has, typically, six integrated circuits 145 of any suitable and well known construction individual to the bits, only the circuit for two bits of each memory being shown in FIG. 3 since the connections of the other four circuits will be readily apparent. A schematic internal arrangement is only shown for circuits 145 of memory 47 since identical arrangements are used in memory 51. Each memory 47 or 51 has an input latch 147 and an output latch 148 which are clocked by signal 143 centrally of a pixel time. Latch 147 and latch 148, respectively, retain a pixel value being provided to and output from the memory. The bit values individual to the circuits 145 are written to a memory location addressed earlier in a pixel time cycle by signals 68, 142, and 143, while data from this location has become available to output latch 148.

Each circuit 145 provides a plurality of storage locations 150 individual to the corresponding bit values and addressable as a two dimensional array having orthogonally related rows 151 and columns 152. The individual rows are selected by decoding address signal 68 during the portion of a pixel cycle when signal 140 has a predetermined level, and the individual columns are selected by decoding signal 68 when signal 141 has a predetermined level. As a result, a row address signal and a column address signal are provided during each pixel time interval to each of the memories 47 and 51 and these signals uniquely determine in each memory a location from which a pixel value is output through latch 148 and in which a pixel value received by the memory is stored. Since memories 47 and 51 receive signals 67 and 68 in parallel, they receive during each pixel time interval substantially the same row address signal and column address signal so that corresponding locations of the memories are addressed during the interval. When a video frame has, as described above, 482 lines of data each divided into 507 pixels, it is convenient to use memory elements addressable as a square array having 512 rows and 512 columns, such elements of circuits 145 being represented in FIG. 3 by the corners of such an array. Since 512 is $2^9$, address signal 68 has nine bits and is decoded by a pair of decoders 155 to select an individual row and an individual column by a pair of gates 156 individual to the decoders and receptive individually to signals 140 and 141.

Timing and address generator 60, shown in FIG. 1, is shown in greater detail in FIGS. 4A and 4B and includes an oscillator 160, typically 39.312 MHz. The output of this oscillator is counted down by a divide by 78 circuit, to give a standard 504 KHz signal 162 to camera 22, and by a divide by four circuit which provides signal 164 having a 101.75 ns period, the above noted one pixel time interval. The output of oscillator 160 is also provided to a slave clock generator 166 which, in any suitable manner, generates signals 41 and 94, generates a pixel rate signal 167 for synchronizing digital to analog converter 53, and generates any suitable clock signal 168 for synchronizing range selector 35 with subject processor 20.

Pixel time signal 164 is provided to a first pixel counter 175 which counts at pixel rate to a digital value substantially greater than the number of pixels in a line, counter 175 typically having a 10 bit or 1023 maximum count output when used with the video line subdivision of the 624 pixel times line shown in FIG. 8B. Counter 175 is reset at the beginning of every line by horizontal drive signal 72. Signal 72 is provided to a first line counter 177, which is similar to counter 175, but which increments at line rate when clocked by signal 72 and is reset a the beginning of every video frame by frame pulse signal 70. The output of counter 175 is provided to decoders 181 through 184 and the output of counter 177 is provided to decoders 185 through 189. These decoders are of any suitable construction so as to assert a single bit output signal during a predetermined range of counts from the corresponding counter 175 or 177. For reasons subsequently explained, the outputs of decoders 185 and 186 are provided to an or gate which generates therefrom signal 191 and the output of decoders 187 and 188 are provided to an or gate which generates therefrom signal 192.

The signal generated by decoders 181 through 188 will now be described in greater detail. Referring to FIGS. 4B and 8B, it is seen that decoder 183 generates a pixel processing start signal 200 overlapping the pixel count of 117 from counter 175 at which count the first valid data of a video line is provided from camera 22 to A/D converter 40. Following this pixel count there is, typically, a few pixel times delay in A/D converter 40 and in horizontal processor 45, the latter delay being in addition to a subsequently explained delay of one line time in this processor. Signal 200 may, however, be required somewhat prior to pixel count 117 from counter 175 in order to initialize memories 47 and 51 before pixel values to be stored arrive thereat. It will be evident to those skilled in the art that the exact counts of counter 175 during which signal 200 is asserted may be predetermined to any desired value by decoder 183 to accommodate such delays and initialization requirements. The precise periods during each video line during which horizontal processor 45 and vertical processor 49 receive valid pixel values from, respectively A/D converter 40 and first frame memory 51 are indicated to these processors, respectively, by the signals 110 and 111 which are output during predetermined counts from counter 175 and determined, respectively, by decoders 181 and 182. Due to delays in the order of several pixel times before processing or storing video data after valid data is available from camera 22 at the above noted pixel count of 117, the first pixel of, for example, each line stored in second frame memory 51 may not be valid since this memory is started at the same time as memory 47. However, by outputting more locations from memory 51 than there are locations with valid pixel data and by suppressing the conversion of the invalid data by D/A converter 53 except when a signal 205 is provided thereto by a decoder 184, this invalid data is not output in signal 28 from subject processor 20.

Referring to FIG. 4B and to FIG. 8A, wherein the time of occurrence of video data in two fields in each frame is shown, it is seen that decoder 185 provides a signal 210 during those counts of counter 177 corresponding to the first field and that decoder 186 provides such a signal 211 during the second field, these signals being combined as signal 191 for purposes subsequently explained. Signal 192 is generated similarly to signal 191 but is asserted only during video lines when valid data is available to D/A converter 53 to prevent output of invalid data present in memory 51 due to starting memory 51 at the same time as memory 47 although initially, due to delays in the order of one line time as in processor 49, valid data is not yet available from memory 51. During lines having valid video data as indicated by signal 191 and during the portions of those lines during which this data is present as indicated by signal 200, a signal 215 is generated from signals 191 and 200 by an and gate 216, shown in FIG. 4A, to indicate the presence of data to be stored in memory 47.

Generator 60 includes memory enable counter 220 which is incremented every pixel time by signal 164 when signal 215 is asserted. Output signal 222 of counter 220 is then asserted, as shown in FIG. 8B, for a number of pixel times equal to the number of rows 151 and columns 152 shown in FIG. 3, of the circuits 145 used in memories 47 and 51. Signal 222 is inverted as signal 223 and provided to stop counter 220 until restarted by signal 215. Signal 222 is provided to a memory slave clock generator 225, which generates in any suitable manner the signals 140 through 143 included in memory control signals 67 to cycle memories 47 and 51. Generator 225, typically, uses pixel time clock signals 164 in generating signals 140 through 143 and is initialized by signal 215 when pixel processing start signal 200 is asserted. Generator 225 also generates a signal 226, which changes level midway between the level changes of signals 140 and 141 and is applied to an exclusive or gate 227 to generate an address control signal 228, shown in FIGS. 4A and 8C, for a purpose subsequently described.

Timing and address generator 60 includes a second pixel or column counter 230 shown in FIG. 4A and clocked every successive pixel time by signal 164 through an and gate 232 when signal 222 is asserted. Counter 230 has a maximum count equal to the number of pixel times during which signal 222 is asserted so that this counter cycles from and returns to zero and thus generates sequentially the address of rows 151 and columns 152 of memories 47 and 51 during each cycle. These addresses are output from counter 230 as a first address signal 233 which has nine bits when used with memory circuits 145 addressed as having 512 rows and 512 columns.

Generator 60 has a field number flip-flop 235 which generates a field number signal 236, shown in FIGS. 4A and 8A. This signal is at "0" level during the first field of each frame, is at "1" level during the second field, and changes state at the end of valid video data for each frame since flip-flop 235 is triggered by a signal 238 which is the inversion of signal 191.

Signal 238 is provided to a row counter or second line counter 240 to reset this counter at the end of every field. Counter 240 provides, when employed with memory circuits 145 having 512 rows and 512 columns, an eight bit output signal 241 which is incremented at the end of every line by signal 223. The incrementing of counter 240 thus occurs, ultimately, in response to horizontal drive signal 72 which resets counter 175 determining the point at which signal 200 from decoder 183 starts memory enable counter 220 and thereby determining the point at which the enable counter completes its count and the state of signal 223 changes. Signal 241 serves as the most significant bits of a second address signal 243 of which the field number signal 236 is the least significant bit. As a result, signal 243 provides addresses for alternate video lines during the first and second fields of each video frame to provide the above-described interlaced line format.

Figure 8C:
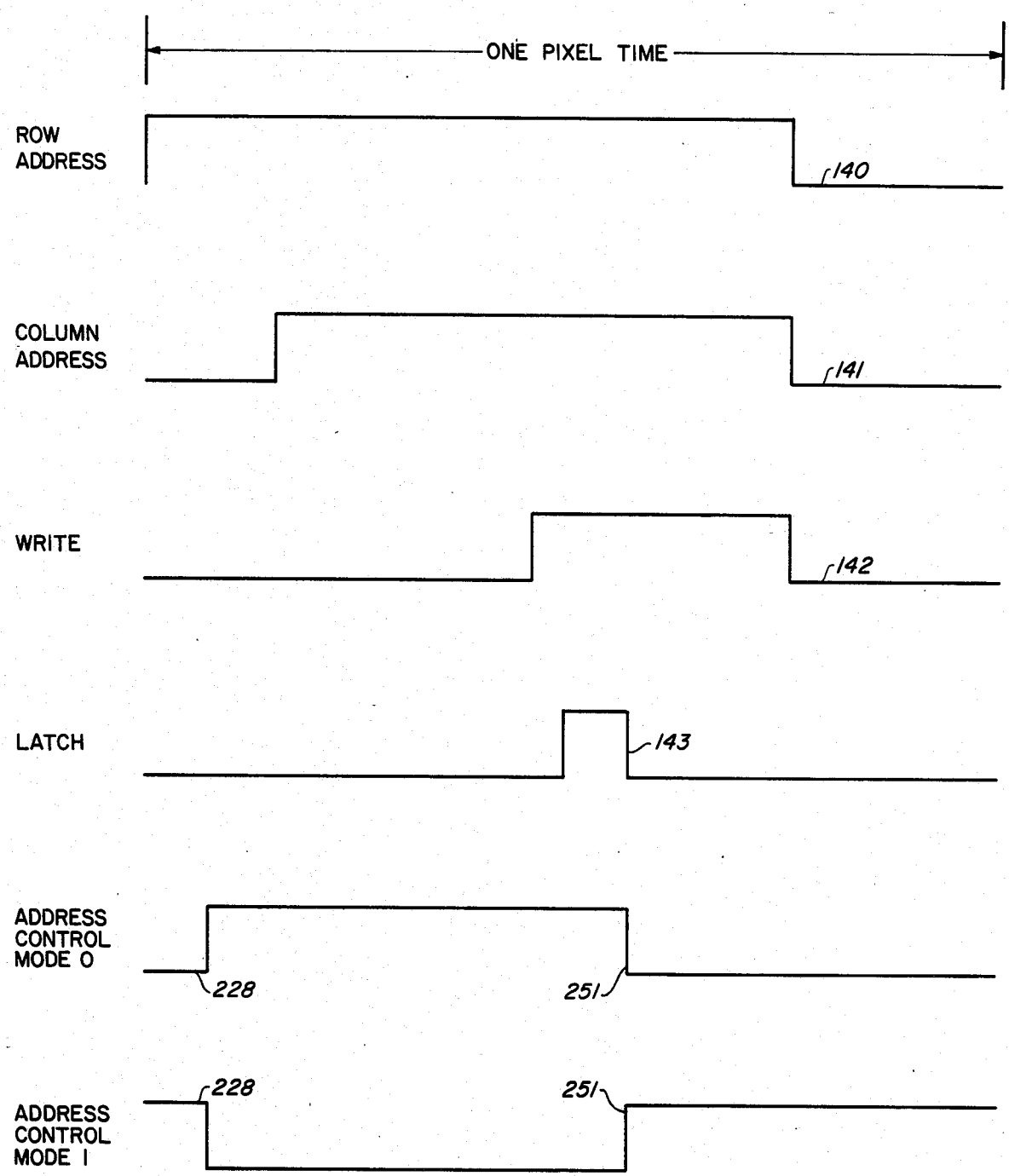

Field number signal 236 is divided by two to provide a row/column mode signal 250 which, as seen in FIG. 8A, has opposite levels during alternate video frames. Signal 250 is provided to an exclusive or gate 227 so that, as seen in FIG. 8C, address control signal 228 is of alternate phase on alternate frames at its transition 251 between the times at which the presence of row and column addresses are signalled to circuits 145 by signals 140 and 141. Generator 60 has an address multiplexer 252 which receives address signals 233 and 243 and provides, as determined by signal 228, one of these address signals as the memory address signals 68. As a result, during alternate frames of input signal 27, counter 230 is the source of column addresses for memory circuits 145 and counter 240 is the source of row addresses therefor and, during the other frames, counter 230 is the source of such row addresses and counter 240 is the source of such column addresses.

Field number signal 236 and valid line present signal 191 are used, in any suitable manner as by a gate 255 shown in FIG. 4A, to generate update coefficients signal 257 for selector 35. Signal 257 is asserted, as seen in FIG. 8A, when no valid video line data is available and when signal 236 is not asserted. Signal 257 is thus generated, ultimately, in response to frame pulse signal 70 which resets counter 177 at the beginning of every frame so that decoders 185 and 186 generate signal 191 which, with signal 236 and the output of flip-flop 235, results in the occurrence of signal 257 at the appropriate time during each frame.

OPERATION

The operation of the described embodiment of the subject invention and the practice of the method thereof will now be described, initially with reference to FIGS. 1, 5A, and 5B.

As the first pixel value in signal 42 of a sequence of values representing each horizontal line of an input video frame is received by horizontal line processor 45, ready signal 110 initiates the performance by processor 45 of a plurality of first interpolations between successive values, which correspond to adjacent pixels along each such line, to generate transformed pixel values of the vertically corresponding horizontal lines of an intermediate output frame corresponding to the input frame. A representative input image is shown in FIG. 5A and a representative such intermediate image is shown in FIG. 5B. Since there is horizontal line correspondence between the images, both images occupy the same number of adjacent horizontal lines. However, along each line there is a different number of adjacent pixels representing the intermediate image than the input image in accordance with relations between pixels thereof as predetermined by a transform being utilized along a dimension corresponding to the horizontal lines for varying the size of the input image.

It is apparent that, when performing such interpolations on a predetermined number of pixel values along each line of the input image to generate a predetermined number of pixel values along each line of the intermediate image, the relative horizontal size of the images is the ratio of these numbers. For example, in FIG. 5B there are twice as many image values along each line as in FIG. 5A so that a pair of image pixels of each output horizontal line would have the same value as each image pixel of the input line if zero order interpolation is employed by the transform utilized. If the image size ratio is not an integer, averaging between input pixel values may be used in a transform determining output pixel values. It can be seen that, for any type of interpolation, the values of corresponding pixels along each input horizontal line determine the values of the same pixels along each output horizontal line. For example, in the simple example of FIGS. 5A and 5B, input pixels 300 through 303 determine, respectively, the values of output pixels 305 through 308 although some of the values represent the background in both images. As a result, in the method of the subject invention, the same interpolations are used with every one of the horizontal lines for the vertically corresponding pixels thereof. Processor 20 is adapted for use with this method in that, as in horizontal processor 45 shown in FIG. 2, there is a unique correspondence between every location in coefficient memory 99 and every location in line memory 82, the coefficient memory being loaded once every input video frame for repeated use in processing every horizontal line thereof.

Figure 6A:
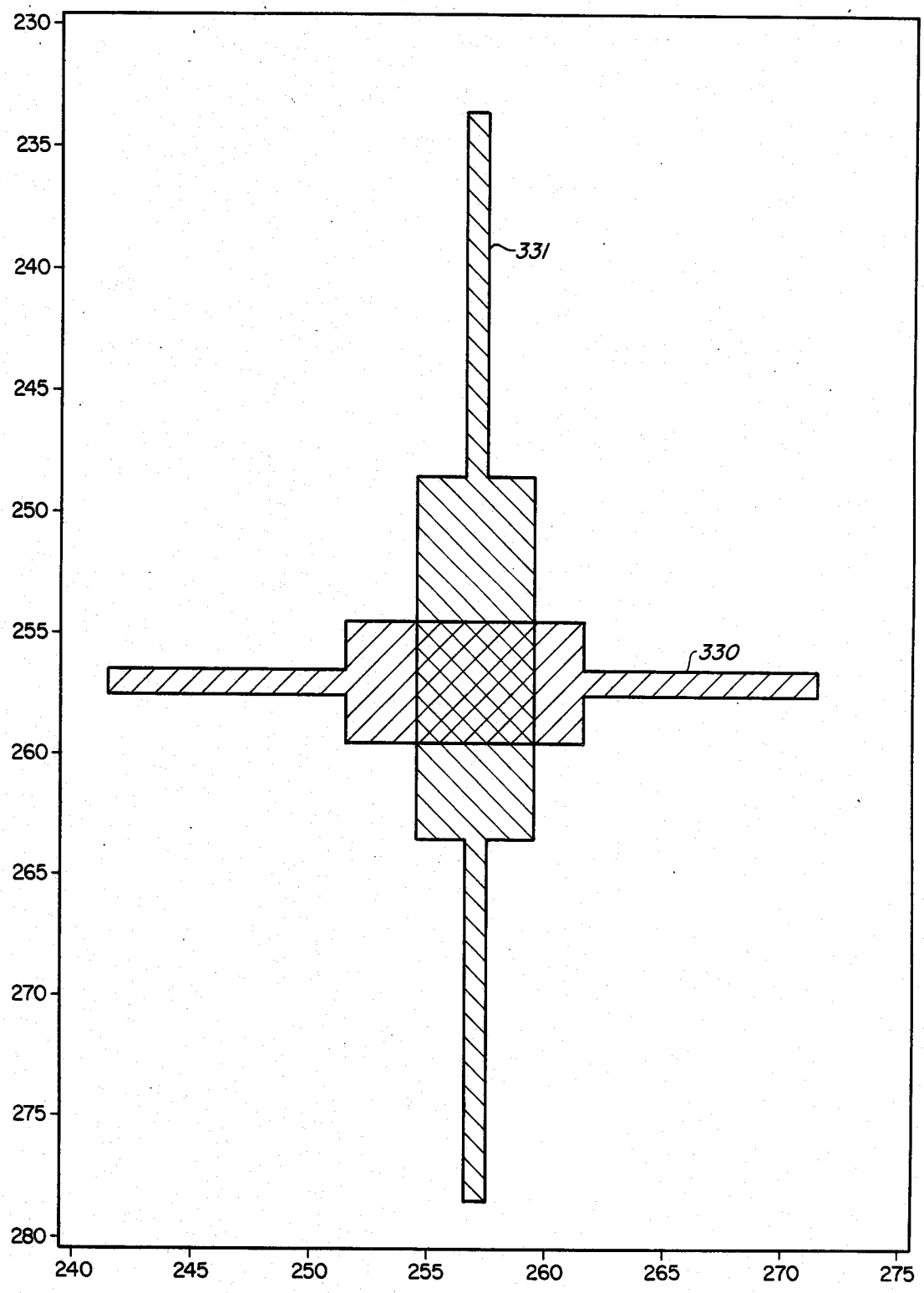
FIGS. 6A and 6B are diagrams similar to FIGS. 5A–5C showing a successive pair of images stored in orthogonal relation and expanded to different extents at successive steps in their expansion by the video processor.
Figure 6B:
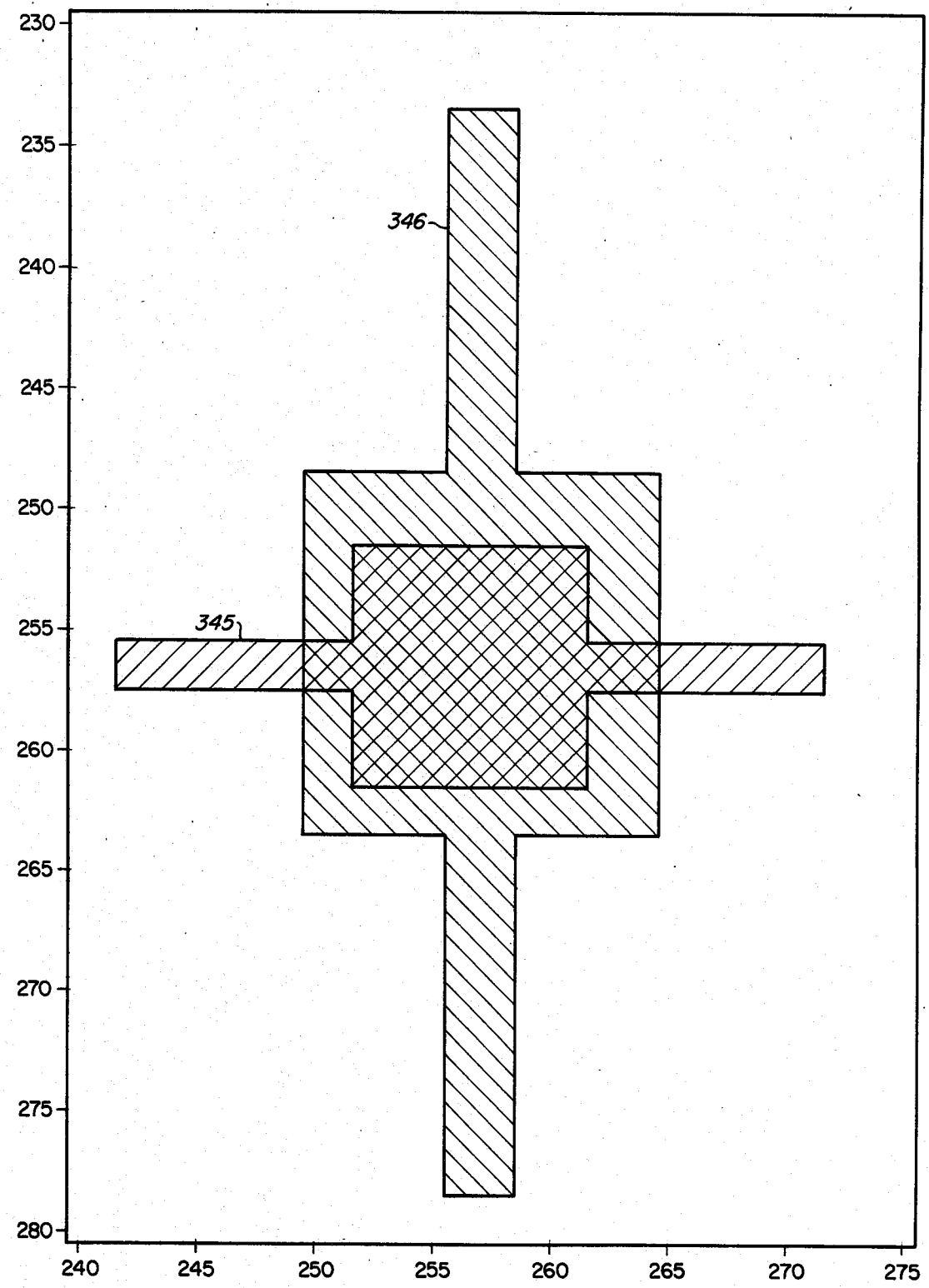
Figure 7A:
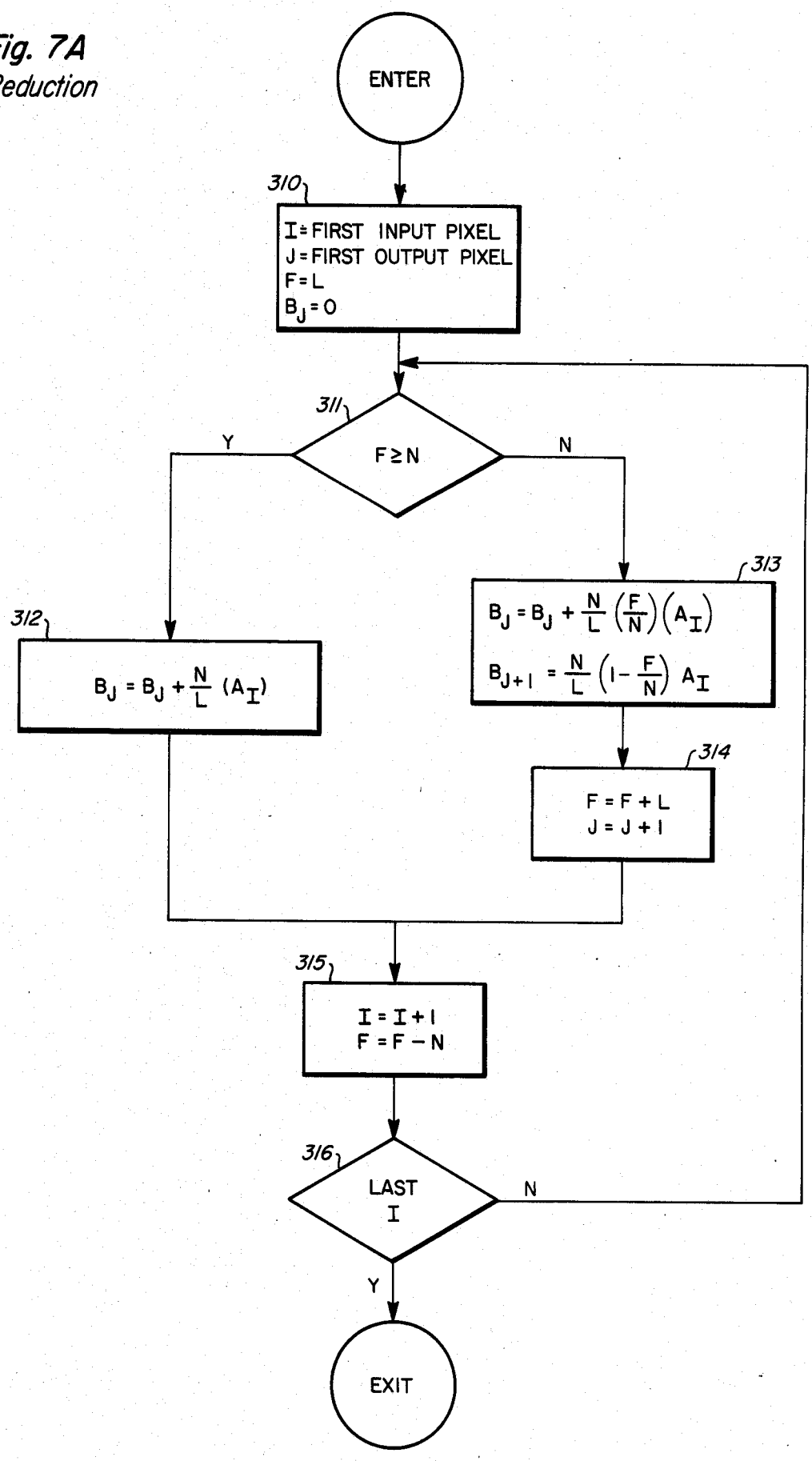
FIGS. 7A and 7B are flow charts corresponding to the calculation of pixel values during, respectively, reduction and expansion of images by the video processor.
Figure 7B:
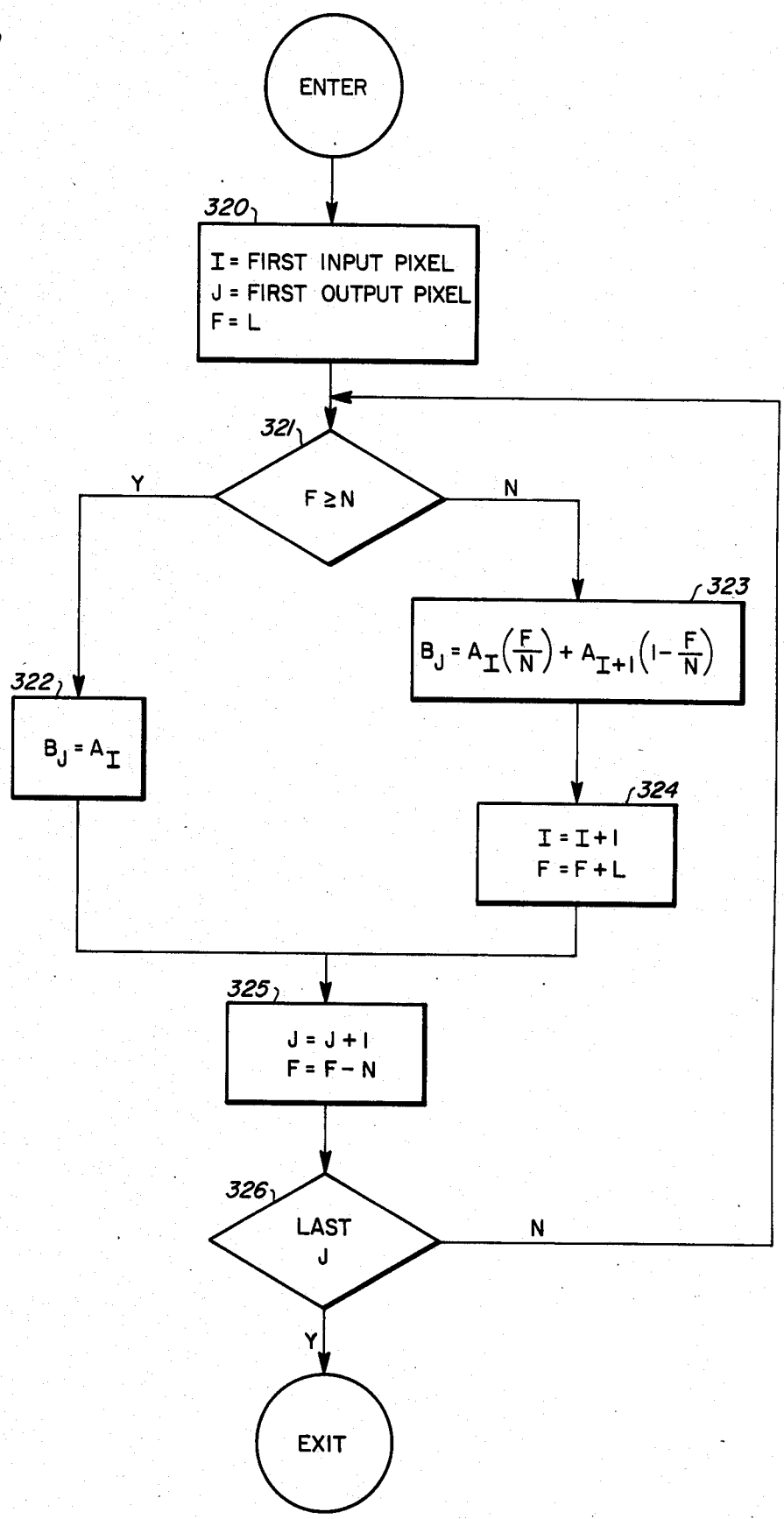

More specifically, the subject invention includes the use of calculations represented in FIG. 7A for reducing an input image and calculations represented in FIG. 7B for expanding an input image. It is evident from FIGS. 5A through 5C that an input video image digitized as previously described may be considered as a two dimensional array in which pixel values representing successive horizontal lines are elements of successive row vectors of the array and in which the values representing corresponding digitizing intervals of successive such lines are elements of successive column vectors, with the elements representing the image occupying a plurality of adjacent elements along one or more of the row vectors and one or more of the column vectors. Digital values representing such an array may be stored in a digital memory, such as memory 47 or 51, with the row vectors or column vectors of the array stored individually along memory rows 151 or columns 152, represented in FIG. 3, for convenient access by the row and column addresses of the memory. FIGS. 5A through 6B bear marginal numerals designating by an orthogonal coordinate system the elements of such an array having 512 rows and 512 columns which correspond to the size of memories 47 and 51 and in which the images are centrally located so that only the corresponding numerals are shown. It is evident that the numerals associated with each axis of such a coordinate system serve as an index to the elements of the vectors parallel to the axis.

FIG. 7A is a flow chart defining steps of interpolation calculations of the subject method as carried out by arithmetic and logic unit 84, which is shown in FIG. 2 and uses coefficients from memory 99, for reducing the size of an input image in a direction along a first row or column vector "A" of an array, as described in the previous paragraph, so that there are more pixel values representing the original image along each such vector than there are pixel values along a corresponding second vector "B" of a transformed image.

In the first step, shown in block 310 of FIG. 7A, certain indices and the first transformed element are initialized, it being given that "L" is the number of pixel values in first vector A and that "N" is the number in the second vector B. An index "I" to the elements of the first vector A is initialized to a value specifying the location of the first pixel value to be used from the first vector, and an index "J" to elements of the second vector is initialized to the location of the first pixel value to be output. Typically, on reduction I is the lowest numbered location of an input row or column, since every input pixel may be used, and J is selected to position the output image at a desired position in the overall array. The image may, therefore, be translated in the direction of the vectors by varying the value with which J is initialized. With processor 20, the values corresponding to J are the address portions of the coefficients stored in memory 99 shown in FIG. 2. These address portions are provided as signal 132 to line memory 82, selector 35 setting signal 86 on reduction so that multiplexers 96 direct signal 132 to memory 82 to control storage of the transformed pixels therein. Since on reduction the input pixels are directed, as before stated, directly to unit 84, the input pixel values are provided thereto sequentially in their numerical order along the first vector. To complete the initialization, an arbitrary index "F" is set to L and the value of the transformed element to be calculated, $B_J$, is zeroed.

The interpolations are then performed with the calculation for each depending, as indicated by decision block 311, on the current relation of F and N. When F is greater than or equal to N the transformed value B is increased, as shown in block 312, by the ratio N/L, which is always fractional, times the input pixel value $A_I$. When F is less than N, the input pixel value affects two transformed pixel values which are calculated as shown in block 313. The final transformed pixel value, $B_J$, is obtained by adding to the already calculated amount the ratio N/L(F/N) times the input pixel value $A_I$, and the next pixel value, $B_{J+1}$, is initialized to $A_I$ times the ratio N/L(1−F/N). To continue the calculation for the next transformed value, as shown in block 314, F is re-initialized as F+L and J is incremented.

Referring to FIG. 2, it is apparent that line processors 45 and 49 are well suited to carry out the interpolation calculations just described by storing in memory 99 successive coefficients in which the individual factors 130 thereof are successive values of N/L, as calculated in block 312, or N/L(F/N), as calculated in block 313 and in which the individual factors 131 are zero when factor 130 is N/L and are N/L(1+F/N) when factor 130 is N/L(F/N). When image reduction in accordance with the method of the subject invention is carried out by processors 45 and 49, the initializations and comparisons of blocks 310, 311, 314, and 315 are, of course performed when factors 130 and 131 are generated by selector 35 for storage in memory 99 as portions of coefficients therein.

As indicated by block 316, the reduction calculations terminate when the last input pixel value is utilized. This termination need not be explicitly defined, as when the subject method is carried out with processors 45 and 49 and the reduction calculations terminate when the last valid input pixel is provided or when counter 98 has addressed every location in memory 99. When the index to the last valid transformed pixel is known, coefficients may be loaded in memory 99 with any address for signal 132 and/or suitable factors 130 and 131 to control the pixel values stored in a transformed array after the last pixel actually representing an image portion is generated.

FIG. 7B is a flow chart defining the interpolations calculations of the subject method carried out generally as above described, but for enlarging an input image so that along a first vector "A" of an input image, there are fewer pixel values along a corresponding second vector "B" of a transformed image. In FIG. 7B "L" is defined as the number of pixel values in the second vector which represent the transformed image; "N" is the number of pixel values in the first vector representing the input image; "I" is an index to the first vector; "J" is an index to the second vector; and "F" is an arbitrary index. The calculations are initialized as shown in block 320 by setting I to the a value specifying to the first pixel value to be transformed, by setting J to the a value specifying to the first output pixel value generated, and by setting F equal to L.

Referring to FIG. 2, when processors 45 and 49 are, in effect, initialized for expansion, successive coefficients in memory 99 are provided with addresses for line memory 82 as signal 132 to index successively the locations therein starting with the lowest numbered location having a pixel value of the input image. Since every pixel value in a line will be output during expansion, the output index is initialized when address counter 98 is zeroed by signal 110.

As indicated by blocks 321 and 322 of FIG. 7B, when F is greater than or equal to N the current output pixel value is made equal to the current input pixel value as a nearest neighbor interpolation. With processors 45 and 49 this equality is caused by zeroing factor 131 of the coefficient previously addressed in memory 99 and by setting factor 130 of the currently addressed coefficient to one in the manner described above. When F is less than N, the current output pixel value is, as shown in block 323, influenced by both the current input pixel value and the next input pixel value and is equal to the sum of the current value times the factor F/N and the next value times the factor 1−F/N. With processors 45 and 49 the interpolation calculation of block 323 may be performed by setting to F/N factors 131 of the immediately previously addressed coefficient from memory 99 and by setting to (1−F)/N factor 130 of the coefficient addressed when such current output pixel value is generated.

After the calculation of block 232 and as shown in block 324, I is incremented to the next input pixel and F is re-initialized by adding L thereto. After the calculations of block 322 or block 324, the calculations of block 325 are performed to advance to the next output pixel value by incrementing J and by subtracting N from the current value of F. When image expression in accordance with the method of the subject invention is carried out by processors 45 and 49, the incrementation of J occurs, in effect, when address counter 98 is incremented, and the initializations and the comparisons performed in blocks 320, 321, 324, 325, and 326 are performed when the factors provided as signals 130 and 131 are determined by selector 35 for the coefficients stored in memory 99. When the last transformed pixel value has been utilized, the expansion interpolation calculations for the current line terminate as indicated by block 326. With processors 45 and 49 these calculations may terminate because counter 98 has addressed the highest address in memory 99 or may terminate, in effect, because of the factors and/or addresses providedin the coefficients stored in this memory for use after the last input pixel representing an actual image is used.

As previously described, transformed pixel values from processor 45 are received sequentially by first frame memory 47 in the order the values are generated by this processor; memory column counter 230 is incremented every pixel time; and memory row counter 240 is incremented every video line time that pixel values are stored in memory 47. Due to multiplexer 252 and gate 227 as controlled by signal 250, counters 230 and 240 are used during alternate input frames to address, respectively rows 151 and columns 152 of circuits 145. During such alternate frames the pixel values corresponding to such horizontal lines are stored in succession along and correspond individually to the rows of these circuits. However, when signal 250 changes its level during the other input frames, the horizontal line pixel values are stored along columns of circuits 145 with such lines corresponding individually thereto. Since the same address is used each pixel time for outputting from circuits 145 and for inputting thereto, the pixel values input along memory rows during each such alternate frame are output along memory columns during the following such other frame, while pixel values input along memory columns each such other frame are output along memory rows during the following such alternate frame. As a result, memory 47 always stores pixel values from processor 45 in a direction corresponding to horizontal lines of a video frame and always outputs these values to processor 51 in a direction corresponding to vertical lines of a frame. This storage arrangement is illustrated in FIG. 6A in which an image 330, which is similar to the image of FIG. 5B in being doubled in size horizontally by processor 45 from the input image of FIG. 5A, may be considered as having been input row-wise of memory 47 and as being output column-wise while an image 331, which has been tripled in size horizontally by processor 45 from the input image of FIG. 5A, is being input column-wise of memory 47 for subsequent output row-wise to processor 49.

As vertical processor 49 receives the pluralities of successive pixel values corresponding to each column of a video image from memory 47, this processor performs a second plurality of interpolations to vary the size of the input image in a direction along the column. As a result, the pixel values generated by processor 49 occupy the same number of column vectors as the values input thereto, but occupy a different number of pixel values along the column vectors. Referring to the simple example of FIGS. 5A through 5C in which the image of FIG. 5A is doubled in size to obtain the image of FIG. 5C, it is apparent that vertical processor 49 can utilize the method of the subject invention to determine from the values of pixels 305 through 308 of the image of FIG. 5B, respectively, the values of pixels 340 through 343 of the output image of FIG. 5C. Since processors 45 and 49 are substantially identical structurally and functionally, it is believed that the previous description of the method of the subject invention with the application thereof to deriving the coefficients stored in memory 99 of horizontal processor 45 adequately explains the use of this method and the derivation of the coefficients stored in a corresponding memory of vertical processor 49.

While there is no requirement that, for any one frame, the ratio of the number of input pixel values to the number of transformed pixel values for each column processed by vertical processor 49 be substantially the same as the ratio of the number of input pixel values to the number of transformed pixel values in each row processed by horizontal processor 45, it is apparent that, if these ratios are substantially the same, the image output by the overall processor 20 will be varied in size linearly from the image input thereto as is normally desired when simulating the variation in size of an image of an object represented by model object 24 during approach thereto.

Since second frame memory 51 receives substantially the same row and addresses as memory 47 and is substantially identical thereto, it is apparent that pixel values received by memory 51 in succession from vertical processor 49 are stored in memory 51 during the above-identified other video frames with the pixel values corresponding to columns of the image being stored successively along and corresponding individually to columns of circuits 145 of memory 51, while pixel values corresponding to rows of the previously stored frame are output successively from the memory columns. Conversely, during the above-identified alternate frames pixel values along columns of an image are stored successively along rows of such memory circuits and correspond individually thereto while pixel values corresponding to rows of the immediately previous frame are output from the memory rows. As a result, memory 51 always stores pixel values from processor 49 in a direction corresponding to vertical lines of a video frame and always outputs such values to D/A converter and signal restorer 53 in a direction corresponding to horizontal lines of a video frame. This storage arrangement is illustrated in FIG. 6B showing an image 345, which is similar to the image of FIG. 5C and has been doubled in size vertically from the image of FIG. 5B by processor 49, may be considered as being output row-wise of memory 51 while an image 346, which has been tripled in size from image 331 of FIG. 6A along the originally vertical direction of the image of FIG. 5A, may be considered as being input row-wise of memory 51 for subsequent output column-wise of this memory to D/A converter and signal restorer 53. It is evident from FIGS. 5A and 6B that the interpolations performed by processor 45 and by processor 49 generate a two dimensional array of pixel values stored in memory 51 and representing the output image 345 or 346 which is varied in size from the input image of FIG. 5A.

Referring to FIG. 1 and the foregoing description, it is evident that the interpolations of processor 45 are performed on the plurality of pixel values repesenting the signals of one video frame subsequent to digitization of the signals by A/D converter 40 and prior to storing the values as row vectors of a first array, typified by FIG. 5B, in memory 47. It is also evident that the interpolations of processor 49 are performed on pixel values of each column vector of the first array and that the generated pixel values are stored as column vectors of a second array typified by FIG. 5C.

D/A converter and signal restorer 53 receives successive pixel values, which are stored in memory 51 as a two dimensional array in a direction along the array corresponding to horizontal lines of a video frame, with the plurality of such values corresponding to successive lines being provided in succession. As a result, converter and restorer 53, as controlled by signals 167, 192 and 205, generates individually and in the proper succession video signals corresponding to the horizontal lines of a video frame having an output image.

With the processor 20 carrying out the method of the subject invention, after two or more video frames have been process and at a time at which signal 27 represents a line of one such frame, A/D converter 40 is generating a first plurality of pixel values representing the line. At each pixel interval during this time one pixel value of the one frame is generated by converter 40 and, during this interval, another and previously so generated pixel value of the one frame is received by horizontal processor 45. During this interval processor 45 generates, by interpolation as previously described and from a first previously generated value of such first plurality, a first transformed pixel value corresponding to the one frame. During such interval a second transformed pixel value previously generated by processor 45 and corresponding to the one frame is stored in first frame memory 47 as an element of row vector of the array being stored in this memory and representing the one frame.

During each such pixel interval and as such second pixel value is stored in memory 47, a first transformed pixel value corresponding to the frame input immediately previously to the one frame is output from memory 47 and received by vertical line processor 49. This value of such previously input frame is being output as one element of a second plurality of pixel values stored as a column vector of the array representing the previous frame because of the above-described alternation of memory row and column addresses on immediately succeeding input frames.

During such pixel time interval a second transformed pixel value, which is included in the second plurality thereof and corresponds to such previously generated frame, is generated by processor 49, by interpolation as previously described, and another pixel value, which was generated by processor 49 from a third pixel value of the second plurality generated previously to such second value thereof, is being stored in second frame memory 51 as an element of a column vector of an array of pixel values representing such previous frame.

At such pixel interval a first pixel value of a third plurality thereof corresponding to a line of the video frame, which was, in turn, immediately previous to the frame immediately previous to the one frame, is output from memory 51 to D/A converter and signal restorer 53 while a second pixel value of the third plurality thereof is used by converter and restorer 53 is generated a signal representing a line of a video output frame corresponding to the input frame which preceded the frame before the frame being presently converted by A/D converter 40. It is evident that, with these events occurring each pixel time interval, the portion of signal 28 from processor 20 representing an output line is obtained substantially two frame times after the corresponding line of an input image is digitized by converter 40 since an array corresponding the frame having the input line is stored first in memory 47 and then in memory 51 at the input pixel rate and, therefore, frame rate.

The subject invention is thus effective to vary the size of successive video images in near real time with the size of each imge undefined until the vertical retrace time preceding the image and using substantially no more memory than is required for storage of two arrays each representing a video frame.

Obviously, many modifications and variations of the present invention are possible in light of the above teachings. It is, therefore, to be understood that within the scope of the following claims the invention may be practiced otherwise than as specifically described.

What is claimed is:

1. A video processing method for varying the size of an input video image in a video frame represented by the time varying signals individually corresponding to successive lines of the frame, the method comprising the steps of:

digitizing each of a plurality of said time varying signals at a plurality of predetermined intervals to generate a plurality of pixel values representing each signal individually at each interval of said plurality of pixel values;

storing the pixel values for access as a two dimensional array with such values representing successive such lines stored along successive row vectors of the array and such values representing successive corresponding such intervals stored along successive column vectors of the array, so that the input image corresponds to a stored image in which such values occupy a plurality of adjacent such row vectors and occupy a plurality of adjacent elements along each such row vectors;

perfiorming a plurality of first interpolations between a plurality of adjacent pixel values corresponding to each of a plurality of adjacent row vectors of such an array to generate pixel values representing a transformed video image in which, in such an array, the generated pixel values occupy adjacent row vectors equal in number to said plurality of adjacent row vectors and occupy a different number of adjacent elements along each row vector than said plurality of adjacent pixel values, so that said transformed image is varied in size from the input image in a direction along said lines; and performing a plurality of second interpolations between a plurality of adjacent pixel values corresponding to each of a plurality of adjacent column vectors of such an array to generate pixel values representing a transformed video image in which, in such an array, the generated pixel values occupy column vectors equal in number to said plurality of adjacent column vectors and occupy a different number of adjacent elements along each column vector than said plurality of adjacent pixel values, so that said transformed image is varied in size from the input image in a direction orthogonally related to said lines, so that, when pixel values representing the input image are so stored and said first plurality of interpolations and said second plurality thereof are performed, such an arrary is generated representing an output image varied in size from the input image; and wherein, in said method a transformed image is reduced in such a direction from the corresponding stored image so that along a first vector corresponding to such a direction there are more pixel values representing such stored image than there are pixel values representing the transformed image in a second vector correspondingly positioned in such an array to the first vector, and wherein the pixel values of the second vector are generated by performing a plurality of said interpolations according to the following steps, where L is the number of pixel values in the first vector which represent the stored image, N is the number of pixel values in the second vector which represent the transformed image, A is the first vector, B is the second vector, I is an index to the pixel values of the first vector, J is an index to the pixel values of the second vector, and F is an arbitrary index and the steps are:

(A) setting I equal to a value specifying a first pixel value to be used from the first vector, setting J equal to a value specifying a first pixel value to be generated for the second vector, setting F equal to L, and setting $B_J$ equal zero;

(B) when F is greater than or equal to N, determining $B_J$ as follow:

$$B_J = B_J + N/L(A_I)$$

and proceeding to step (C), and when F is less than N determining $B_J$ and $B_{J+1}$ as follows:

$$B_J = B_J + N/L(F/N)(A_I)$$

$$B_{J+1} = N/A(1 - F/N)(A_I)$$

then setting F and J as follows:

$$F = F + L$$

$$J = J + 1$$

and the proceeding to step (C);

(C) setting I and F as follows:

$$I = I + 1$$

$$F = F = N;$$ and (D) when I is not equal to a value specifying a last pixel value to be used from the first vector, repeating steps (B) and (C).

2. A video processing method for varying the side of an input video image in a video frame represented by time varying signals individually corresponding to successive lines of the frame, the method comprising the steps of:

digitizing each of a plurality of said time varying signals at a plurality of predetermined intervals to generate a plurality of pixel values representing each signal individually at each interval of said plurality of pixel values;

storing the pixel values for access as a two dimensional array with such values representing successive such lines stored along successive row vectors of the array and such values representing successive corresponding such intervals stored along successive column vectors of the array, so that the input image corresponds to a stored image in which such values occupy a plurality of adjacent such row vectors and occupy a plurality of adjacent elements along each such row vectors;

performing a plurality of first interpolations between a plurality of adjacent pixel values corresponding to each of a plurality of adjacent row vectors of such an array to generate pixel values representing a transformed video image in which, in such an array, the generated pixel values occupy adjacent row vectors equal in number to said plurality of adjacent row vectors and occupy a different number of adjacent elements along each row vector than said plurality of adjacent pixel values, so that said transformed image is varied in size from the input image in a direction along said lines; and performing a plurality of second interpolations between a plurality of adjacent pixel values corresponding to each of a plurality of adjacent column vectors of such an array to generate pixel values representing a transformed video image in which, in such an array, the generated pixel values occupy column vectors equal in number to said plurality of adjacent column vectors and occupy a different number of adjacent elements along each column vector than said plurality of adjacent pixel values, so that said transformed image is varied in size from the input image in a direction orthogonally related to said lines, so that, when pixel values representing the input image are so stored and said first plurality of interpolations and said second plurality thereof are performed, such an array is generated representing an output image varied in size from the input image; and wherein, in said method a transformed image is expanded in such a direction from the corresponding stored image so that along a first vector corresponding to such a direction there are fewer pixel values representing such stored image than there are pixel values representing the transformed image in a second vector correspondingly positioned in such an array to the first vector, and wherein the pixel values of the second vector are generated by performing a plurality of said interpolations according to the following steps, where L is the number of pixel values in the second vector which represent the transformed image, N is the number of pixel values in the first vector which represent the stored image, A is the first vector, B is the second vector, I is an index to the pixel values of the first vector, J is an index to the pixel values of the second vector, and F is an arbitrary index and the steps are:

(A) setting I equal to a value specifying a first pixel value to be used from the first vector, setting J equal to a value specifying a first pixel value to be generated for the second vector, and setting F equal to L;

(B) when F is greater than or equal to N determining $B_J$ as follows:

$$B_J = A_I$$

and proceeding to step (C), and when F is less than N determining $B_J$ as follows:

$$B_J = A_I(F/N) + A_{I+1}(1 - F/N)$$

then setting I and F as follows:

$$I = I + 1$$

$$F = F + L$$

and then proceeding to step (C);

(C) setting J and F as follows:

$$J = I + 1$$

$$F = F - N; \text{ and}$$

(D) when J is not equal to a value specifying a last pixel value to be used from the second vector, repeating steps (B) and (C).

3. A video processor for performing a separable two dimensional transform on images individual to successive input video frames to generate images individual to successive output video frames, each frame having successive video signals individually corresponding to parallel video lines of a first set thereof forming the image, the processor comprising:

analog to digital converter means for successively receiving said video signals of each input frame and generating from each one of said video signals a predetermined number of pixel values representing said one signal at predetermined pixel time intervals equal in number to said predetermined number of pixel values, so that the pixel values generated at corresponding pixel time intervals of each of successive such video signals represent pixels of the image along a second set of parallel lines orthogonally related to the lines of the first set;

first frame memory means, having a plurality of storage locations individual to said pixel values and addressable as a two dimensional array having orthogonally related rows and columns, for storing the successive pixel values corresponding to each line of the first set thereof of alternate input frames in succession in such storage locations along said rows with said rows corresponding individually to said lines, for storing the successive pixel values corresponding to each line of the first set thereof of the other input frames in succession in such storage locations along said columns with said columns corresponding individually to the lines of the first set, for outputting pixel values corresponding to said alternate input frames in succession from such storage locations along said columns, and for outputting pixel values corresponding to said other input frames in succession from such storage locations along said rows, so that the pixel values corresponding to each frame are stored by the first frame memory means successively along and in order of the lines of the first set and are output from the first memory means successively along and in order of the lines of the second set;

second frame memory means, having a plurality of storage locations individual to said pixel values and addressable as a two dimensional array having orthogonally related rows and columns, for storing the successive pixel values corresponding to each line of the second set thereof of said alternate input frames in succession in such storage locations along said columns with said columns corresponding individually to said lines of the second set thereof, for storing the successive pixel values corresponding to each line of the second set thereof of said other input frames in succession in such location along said rows with the rows corresponding individually to lines of the second set thereof, for outputting pixel values corresponding to said alternate input frames in succession from such storage locations along said rows, and for outputting pixel values corresponding to said other frames in succession from such storage locations along said columns, so that the pixel values corresponding to each frame are output by the second memory means successively along and in order of the lines of the first set;

first line processor means for receiving in succession pixel values corresponding to successive pixels along individual lines of the first set thereof of each input frame and for generating, from said values corresponding to adjacent pixels in accordance with relations between said adjacent pixels predetermined by said transform along the dimension corresponding to the lines of the first set thereof, first transformed pixel values of the corresponding lines of the first set thereof of each output frame;

second line processor means for receiving in succession pixel values corresponding to successive pixels along individual lines of the second set thereof of each input frame and for generating, from said values corresponding to adjacent pixels of each such line and in accordance with relations between said adjacent pixels predetermined by said transform along the dimension corresponding to the lines of the second set thereof, second transformed pixel values of the corresponding lines of the second set thereof of each output frame; and digital to analog converter and signal restoration means for receiving in succession the pixel values of each line of the first set thereof of each output frame and for generating from said values video signals corresponding to the first set of lines of the output frame, wherein, in said video processor:

the first line processor means receives pixel values directly and in succession from the analog to digital converter means as said pixel values are generated thereby;

the first frame memory means receives pixel values directly and in succession from the first line processor means as said pixel values are output therefrom;

the second line processor means receives pixel values directly and in succession from the first frame memory means as said pixel values are output therefrom;

the second frame memory means receives pixel values directly and in succession from the second line processor means as said pixel values are generated thereby;

the digital to analog converter and signal restoration means receives pixel values directly and in succession from the second frame memory means as said pixel values are output therefrom;

wherein the input frames are associated with individual frame signals indicating the beginning of the frames and with line signals indicating the beginning of each line of the first set thereof;

wherein the first frame memory means and the second frame memory means are each responsive in each of said predetermined pixel time intervals to a row address signal and to a column address signal for outputting, from a storage location uniquely determined by said row address signal and said column address signal, a pixel value stored in the memory means and for storing, at a storage location uniquely determined by said row address signal and said column address signal, a pixel value received by the memory means; and wherein said video processor further comprises timing and address generator means, which has a circuit providing a clock signal defining said predetermined pixel time intervals, for receiving said frame signals and said line signals and for generating from the clock signal, the frame signals, and the line signals:

a timing signal provided to the analog to digital converter means, to the first line processor means, and to the second line processor means indicating each such predetermined pixel time interval;

a ready signal provided to the first line processor means indicating that such predetermined number of pixel values are being generated by the analog to digital converter means;

a ready signal provided to the second line processor means indicating that such pixel values corresponding to said input frames are being output from the first frame memory means; and a row address signal and a column address signal provided during each of said predetermined pixel time intervals to the first frame memory means and a row address signal and a column address signal provided during each of said predetermined pixel time intervals to the second frame memory means, so that during one pixel time interval:

a pixel value of one input frame is generated by the analog to digital converter means;

a previously generated such value corresponding to said one frame is received by the first line processor means and a first transformed pixel value corresponding to said one frame is generated thereby;

a previously generated such first transformed pixel value corresponding to said one frame is stored in the first frame memory means and such a first transformed pixel value corresponding to a previous input frame previous to said one frame is output from the first frame memory means and received by the second line processor means;

a second transformed pixel value corresponding to said previous input frame is generated by the second line processor means;

such a second transformed pixel value previously generated by the second line processor means and corresponding to said previous input frame is stored in the second frame memory means; and such a second transformed pixel value generated by the second line processor means, corresponding to a frame previous to said previous input frame, and stored in the second frame memory means is output therefrom to the digital to analog converter and signal restoration means.

4. The video processor of claim 3:

wherein, in the first frame memory means and the second frame memory means, each of said storage locations thereof at which a pixel value is stored during one of said predetermined pixel time intervals uniquely corresponds to a storage location from which a pixel value is output during such one interval;

wherein the timing and address generator means, during each such pixel time interval, generates substantially an identical column address signal for provision to both the first memory means and the second memory means so that corresponding locations therein are addressed during each one of said predetermined pixel time intervals; and wherein the timing and address generator means has:
a pixel counter incremented at successive pixel time intervals in response to said timing signal;
a line counter incremented at successive video line times in response to said line signals; and
multiplexer means for providing, during said alternate input frames, the pixel counter as the source of the column address signal and the line counter as the source of the row address signal and for providing, during said other input frames, the pixel counter as the source of the row address signal and the line counter as the source of the column address signal.

5. The video processor of claim 3 wherein, in one of said line processor means, said pixel values received successively thereby and corresponding to successive pixels along a set of lines corresponding to said one of said line processor means are individually associated with coefficient values utilized by said one of said line processor means and wherein said one of said line processor means includes:

coefficient memory means for storing said coefficient values at successively addressable locations of the coefficient memory means;

means providing successive addresses to the coefficient memory means at successive such timing signals following the one of said ready signals provided to said one of said line processor means; and calculator means for receiving each of said pixel values received by said one of said line processor means, for receiving from said coefficient memory means the coefficient value corresponding to each of said pixel values, and for performing between each of said pixel values and the coefficient value corresponding thereto a calculation required by said transform and corresponding to said one of said line processor means.

6. The video processor of claim 5:

wherein, during a predetermined period of time associated with the frame signal of each input frame, no video signal representing a video line forming video image is available to the analog to digital converter means;

wherein the video processor is utilized with a source of said coefficient values; and wherein the video processor includes means connected to said source and to the coefficient memory means for receiving the coefficient memory means for receiving the coefficient values from said source and for providing the coefficient values to said coefficient memory means during said predetermined period of time and includes means receptive to the frame signal means for signalling said source that said predetermined period of time is occurring.

* * * * *